(12) United States Patent
Hafezinasab et al.

(10) Patent No.: US 11,545,892 B2
(45) Date of Patent: Jan. 3, 2023

(54) APPARATUS AND METHOD FOR SINGLE-PHASE AND THREE-PHASE POWER FACTOR CORRECTION

(71) Applicants: Delta-Q Technologies Corp., Burnaby (CA); The University of British Columbia, Vancouver (CA)

(72) Inventors: Hamidreza Hafezinasab, Sunnyvale, CA (US); Christopher Jon Botting, Vancouver (CA); Wilson Allan Thomas Eberle, Kelowna (CA)

(73) Assignees: Delta-Q Technologies Corp., Burnaby (CA); The University of British Columbia, Vancouver (CA)

( * ) Notice: Subject to any disclaimer, the term of this patent is extended or adjusted under 35 U.S.C. 154(b) by 113 days.

(21) Appl. No.: 17/204,671

(22) Filed: Mar. 17, 2021

(65) Prior Publication Data

US 2021/0296982 A1 Sep. 23, 2021

Related U.S. Application Data

(60) Provisional application No. 62/992,626, filed on Mar. 20, 2020.

(51) Int. Cl.
*H02M 1/42* (2007.01)
*H02M 3/335* (2006.01)
*H02M 7/217* (2006.01)

(52) U.S. Cl.
CPC ......... *H02M 1/4266* (2013.01); *H02M 3/335* (2013.01); *H02M 7/217* (2013.01)

(58) Field of Classification Search
CPC ..... H02M 1/4266; H02M 3/335; H02M 7/217
(Continued)

(56) References Cited

U.S. PATENT DOCUMENTS

| 8,395,910 B2* | 3/2013 | Alexander | H02M 7/4807 |
| | | | 363/142 |
| 2011/0025246 A1* | 2/2011 | Sakakibara | H02M 1/4216 |
| | | | 318/400.42 |

(Continued)

FOREIGN PATENT DOCUMENTS

WO 2020/079019 A1 4/2020

OTHER PUBLICATIONS

Musavi et al., "A High-Performance Single-Phase Bridgeless Interleaved PFC Converter for Plug-in Hybrid Electric Vehicle Battery Chargers," *IEEE Transactions on Industry Applications* 47(4):1833-1843, Jul./Aug. 2011.

(Continued)

*Primary Examiner* — Yemane Mehari
(74) *Attorney, Agent, or Firm* — Seed Intellectual Property Law Group LLP

(57) ABSTRACT

A power-factor corrected AC/DC converter has three half-bridge legs, electrically coupled with each other in parallel, each leg having a pair of switches. Each switch of the pair is electrically coupled to the other in series via a respective node that is electrically coupled through an inductor to an AC line. The converter has a fourth half-bridge leg electrically coupled with the other legs to form an electrically parallel circuit. The fourth leg has a pair of switches electrically coupled to each other in series via a fourth node, which is selectively electrically coupleable to a neutral or a second AC line. The converter has a controller that operates the three legs as a 3-channel interleaved AC/DC boost converter and couples the fourth node to the neutral or second AC line if the input is single-phase, and as a 3-phase AC/DC boost converter if the input is three-phase.

24 Claims, 12 Drawing Sheets

(58) Field of Classification Search
USPC ........................................................ 363/21.01
See application file for complete search history.

(56) References Cited

U.S. PATENT DOCUMENTS

2011/0101897 A1* 5/2011 Wei ..................... H02P 25/105
318/400.3
2017/0294833 A1 10/2017 Yang et al.

OTHER PUBLICATIONS

Opila et al., "A Reconfigurable Three- and Single-Phase AC/DC Non-Isolated Bi-directional Converter for Multiple Worldwide Voltages," in *2017 IEEE Energy Conversion Congress and Exposition (ECCE)*, Institute of Electrical and Electronics Engineers, Cincinnati, OH, Oct. 1-5, 2017, pp. 1708-1714.

Sfakianakis et al., "Overview of the Requirements and Implementations of Bidirectional Isolated AC-DC Converters for Automotive Battery Charging Applications," in *2015 Tenth International Conference on Ecological Vehicles and Renewable Energies (EVER)*, Institute of Electrical and Electronics Engineers, Monte Carlo, Monaco, Mar. 31-Apr. 2, 2015, pp. 1-12.

Singh et al., "Single-Phase On-Board Integrated Bi-Directional Charger with Power Factor Correction for an EV," in *2019 6th International Conference on Signal Processing and Integrated Networks (SPIN)*, Institute of Electrical and Electronics Engineers, Noida, India, Mar. 7-8, 2019, pp. 716-721.

Singh et al., "Three-Phase On-board Integrated Bidirectional EV Battery Charger with Power Factor Correction," in *2019 6th International Conference on Signal Processing and Integrated Networks (SPIN)*, Institute of Electrical and Electronics Engineers, Noida, India, Mar. 7-8, 2019, pp. 335-340.

Subotic et al., "An Integrated Multiphase System for Slow and Fast EV Battery Charging," in *18th International Symposium on Power Electronics (Ee2015)*, Novi Sad, Serbia, Oct. 28-30, 2015, pp. 1-5.

United Kingdom Combined Search and Examination Report, dated Nov. 18, 2021, for United Kingdom Application No. GB2103797.3, 16 pages.

Choudhury, "Average Current Mode Controlled Power Factor Correction Converter Using TMS320LF2407A," Application Report, SPRA902A, Texas Instruments, 12500 TI Boulevard Dallas, Texas, USA, Jul. 2005, 15 pages.

Hafezinasab et al., "Investigation Of Solutions For Universal Input 208 V-480 V Three-Phase AC/DC Power Factor Corrected Converters With 400 V DC Output," Doctoral Dissertation, The University of British Columbia, Jul. 2020, 136 pages.

Kolar et al.,, "The Essence Of Three-Phase PFC Rectifier Systems—Part I," *IEEE Transactions on Power Electronics* 28(1):176-200, 2013.

Matsumoto et al., "Development Of 400 Vdc Power Distribution System and 400 Vdc Output Rectifier, Intelec 2009," *31st International Telecommunications Energy Conference*, 2009, pp. 1-5.

Musavi, et al., "An LLC Resonant DC-DC Converter for Wide Output Voltage Range Battery Charging Applications," *IEEE Transactions on Power Electronics* 28(12):5437-5445, 2013.

Papamanolis et al., "22kW EV Battery Charger Allowing Full Power Delivery in 3-Phase as well as 1-Phase Operation," *10th ICPE International Conference on Power Electronics*, Bexco, Busan, Korea, May 27-30, 2019, pp. 1-9.

Pratt et al., "Evaluation Of 400V DC Distribution In Telco And Data Centers To Improve Energy Efficiency," *29th International Telecommunications Energy Conference*, Rome, Italy, Sep. 30-Oct. 4, 2007, pp. 32-39.

Schönberger, "Space Vector Control of a Three-Phase Rectifier using PLECS®," Application Example, Plexim GmbH, Technoparksstrasse 1, 8005 Zurich, ver 04-13, 2013, 5 pages.

Tang et al., "A Bridgeless Totem-Pole Interleaved PFC Converter For Plug-In Electric Vehicles," *IEEE Applied Power Electronics Conference and Exposition*, Long Beach, California, USA, Mar. 21-24, 2016, pp. 440-445.

Vancu et al., "Comparative Evaluation Of Bidirectional Buck-Type PFC Converter Systems For Interfacing Residential DC Distribution Systems To The Smart Grid", *38th Annual Conference on IEEE Industrial Electronics Society*, Montreal, Canada, Oct. 25-28, 2012, pp. 5153-5160.

\* cited by examiner

APPARATUS AND METHOD FOR SINGLE-PHASE AND THREE-PHASE POWER FACTOR CORRECTION

TECHNICAL FIELD

The present application relates to power supplies, and, in particular, to implementations of power-factor corrected AC/DC converters, for use in various applications, including in battery chargers and data centers.

BACKGROUND

Description of the Related Art

The power factor of an AC electrical power system can be defined as the ratio of the real power absorbed by the load to the apparent power flowing in the circuit, and is typically represented as a dimensionless number in the closed interval of −1 to 1. A power factor of less than one indicates the voltage and current are not in phase, reducing the average product of the two.

Instantaneous power is a product of an instantaneous voltage and an instantaneous current. Real power is an average of instantaneous power over a time period. Real power can represent a capacity of an electrical circuit to perform work. Apparent power is a product of a root-mean-square (RMS) current and an RMS voltage. In a three-phase system, apparent power is √3 times a product of an RMS line current and an RMS line voltage. Owing to energy stored in the load and returned to a source, and/or because a non-linear load can distort a wave shape of current drawn from the source, the apparent power may be greater than the real power. A negative power factor occurs when the load is a device that generates power, which then flows back towards the source.

Power-factor correction (PFC) can increase the power factor of a load, improving efficiency for a power distribution system to which the load is attached. Linear loads with low power factor (such as induction motors) can be corrected with a passive network of capacitors or inductors. Non-linear loads, such as rectifiers, distort the current drawn from the system. In various implementations, active or passive power factor correction may be used to counteract the distortion and raise the power factor. Power-factor correction may be centralized at a substation, for example, or it may be spread out over a distribution system, or built into power-consuming equipment.

BRIEF SUMMARY

A power-factor corrected AC/DC converter may be summarized as comprising a first, a second, and a third half-bridge leg electrically communicatively coupled with each other to form an electrically parallel circuit, the first half-bridge leg comprising a first pair of switches, the first pair of switches comprising a first switch and a second switch, each switch of the first pair of switches electrically communicatively coupled to each other in series via a first node, the second half-bridge leg comprising a second pair of switches, the second pair of switches comprising a third switch and a fourth switch, each switch of the second pair of switches electrically communicatively coupled to each other in series via a second node, the third half-bridge leg comprising a third pair of switches, the third pair of switches comprising a fifth switch and a sixth switch, each switch of the third pair of switches electrically communicatively coupled to each other in series via a third node, each of the first, the second, and the third nodes electrically communicatively coupled through a first, a second, and a third inductor, respectively, to an AC port, the AC port comprising a first AC line, a fourth half-bridge leg electrically communicatively coupled with the first, the second, and the third half-bridge legs to form an electrically parallel circuit, the fourth half-bridge leg comprising a fourth pair of switches, the fourth pair of switches comprising a seventh switch and an eighth switch, the fourth pair of switches electrically communicatively coupled to each other in series via a fourth node, the fourth node which in operation is electrically communicatively coupleable to a terminal of the AC port, the terminal which comprises one of an AC neutral or a second AC line, and a controller, wherein, in a first mode of operation, the AC port is an AC input, and, responsive to the controller determining an alternating current (AC) at the AC input is a single-phase AC, the controller is operable to control the first, the second, and the third half-bridge legs to operate as a 3-channel interleaved totem-pole AC/DC boost converter, electrically communicatively couple the fourth node to the terminal of the AC port, and control the fourth half-bridge leg to rectify a line frequency AC current to a DC current, and wherein, in the first mode of operation, responsive to the controller determining the AC at the AC input is a three-phase AC, the controller is operable to control the first, the second, and the third half-bridge legs to operate as a 3 phase AC/DC boost converter.

In some implementations, in a second mode of operation, the AC port is an AC output, and, responsive to the controller determining an AC at the AC output is a single-phase AC, the controller is operable to control the first, the second, and the third half-bridge legs to operate as a 3-channel interleaved DC/AC buck converter, electrically communicatively couple the fourth node to the terminal of the AC port, and control the fourth half-bridge leg to invert a DC current to a line frequency AC current, and wherein, in the second mode of operation, responsive to the controller determining the AC at the AC output is a three-phase AC, the controller is operable to control the first, the second, and the third half-bridge legs to operate as a 3 phase DC/AC buck converter. In some implementations, the power-factor corrected AC/DC converter further comprises a DC port, the DC port which is electrically communicatively coupled through a fourth inductor to the fourth node, wherein, in the second mode of operation, the DC port is a DC input, and, responsive to determining the AC at the AC output is the three-phase AC, the controller is further operable to cause the fourth half-bridge leg to step up to an intermediate voltage from the DC input, the intermediate voltage which is in parallel with the fourth half-bridge leg. In some implementations, in the second mode of operation, a DC input voltage of the power-factor corrected AC/DC converter is an output of an isolated bidirectional DC/DC converter.

In some implementations, the power-factor corrected AC/DC converter further comprises a DC port, the DC port which is electrically communicatively coupleable through a fourth inductor to the fourth node, wherein, in the first mode of operation, the DC port is a DC output, and, responsive to determining the AC at the AC input is the three-phase AC, the controller is further operable to cause the fourth half-bridge leg to step down an intermediate voltage to the DC output, the intermediate voltage which is in parallel with the fourth half-bridge leg. In some implementations, the power-factor corrected AC/DC converter further comprises a ninth switch operable to selectively electrically communicably couple the DC port to one of the fourth node via the fourth inductor, or to the intermediate voltage. In some implementations, the power-factor corrected AC/DC converter further comprises a tenth switch operable to electrically communicably couple the fourth node to the terminal of the AC port. In some implementations, at least one of the ninth or the tenth switches is an electromechanical relay, the controller which in operation opens or closes the electromechanical relay. In some implementations, at least one of the ninth or the tenth switches is one of a user-selectable manual switch or jumper, or a factory-set manual switch or jumper.

In some implementations, in the first mode of operation, an output voltage of the power-factor corrected AC/DC converter is an input to an isolated DC/DC converter. In some implementations, in the first mode of operation, the output voltage of the power-factor corrected AC/DC converter is approximately 400 Volts DC.

In some implementations, at least one switch of the first, the second, the third, the fourth, the fifth, the sixth, the seventh, or the eighth switch comprises at least two switches electrically communicatively coupled in parallel with one another.

In some implementations, at least one switch of the first, the second, the third, the fourth, the fifth, the sixth, the seventh, or the eighth switch comprises at least two switches electrically communicatively coupled in series with each other.

In some implementations, at least one switch of the first, the second, the third, the fourth, the fifth, the sixth, the seventh, or the eighth switch comprises a field effect transistor (FET) device.

In some implementations, the power-factor corrected AC/DC converter further comprises a fifth half-bridge leg, the fifth half-bridge leg electrically communicatively coupled in parallel with the fourth half-bridge leg, wherein, in the first mode of operation, the controller is operable to control the fourth and the fifth half-bridge legs as an interleaved buck converter.

In some implementations, the controller comprises a digital controller.

A method of operation of a power-factor corrected AC/DC converter, the power-factor corrected AC/DC converter comprising a first, a second, and a third half-bridge leg electrically communicatively coupled with one another to form an electrically parallel circuit, the first half-bridge leg comprising a first pair of switches, the first pair of switches comprising a first switch and a second switch, each switch of the first pair of switches electrically communicatively coupled to each other in series via a first node, the second half-bridge leg comprising a second pair of switches, the second pair of switches comprising a third switch and a fourth switch, each switch of the second pair of switches electrically communicatively coupled to each other in series via a second node, the third half-bridge leg comprising a third pair of switches, the third pair of switches comprising a fifth switch and a sixth switch, each switch of the third pair of switches electrically communicatively coupled to each other in series via a third node, each of the first, the second, and the third nodes electrically communicatively coupled through a first, a second, and a third inductor, respectively, to an AC port, the AC port comprising a first AC line, and a fourth half-bridge leg electrically communicatively coupled with the first, the second, and the third half-bridges to form an electrically parallel circuit, the fourth half-bridge leg comprising a fourth pair of switches, the fourth pair of switches comprising a seventh switch and an eighth switch, the pair of switches electrically communicatively coupled to each other via a fourth node, the fourth node which in operation is electrically communicatively coupleable to a terminal of the AC port, the terminal which comprises one of an AC neutral or a second AC line, may be summarized as comprising a first mode of operation, the AC port in the first mode of operation being an AC input, the first mode of operation comprising determining by the controller whether an alternating current (AC) at the AC input is a single-phase AC or a three-phase AC, responsive to determining the AC at the AC input is the single-phase AC controlling by the controller the first, the second, and the third half-bridges to operate as a 3-channel interleaved totem-pole AC/DC boost converter, electrically communicatively coupling the fourth node to the terminal of the AC port, and controlling by the controller the fourth half-bridge leg to rectify a line frequency alternating current (AC) to a direct current (DC), and, responsive to determining whether the AC at the AC input is the three-phase AC, controlling by the controller the first, the second, and the third half-bridge legs to operate as a 3 phase AC/DC boost converter.

In some implementations, the method further comprises a second mode of operation, the AC port in the second mode of operation being an AC output, the second mode of operation comprising determining by the controller whether an alternating current (AC) at the AC output is a single-phase AC or a three-phase AC, responsive to determining the AC at the AC output is the single-phase AC, controlling by the controller the first, the second, and the third half-bridges to operate as a 3-channel interleaved DC/AC buck converter, electrically communicatively coupling the fourth node to the terminal of the AC port, and controlling by the controller the fourth half-bridge leg to invert a DC current to a line frequency AC current, and, responsive to determining the AC at the AC output is the three-phase AC, controlling by the controller the first, the second, and the third half-bridges to operate as a 3 phase DC/AC buck converter. In some implementations, the power-factor corrected AC/DC converter further comprises a DC port, the DC port which is electrically communicatively coupled through a fourth inductor to the fourth node, the DC port which in the second mode of operation is a DC input, the method further comprising in the second mode of operation, responsive to determining the AC at the AC output is the three-phase AC, determining whether a peak voltage value of the three phase AC exceeds a predetermined threshold value, the threshold value based at least in part on a predetermined target value of a voltage of the DC input, and, responsive to determining the peak voltage value of the three phase AC at the AC output exceeds the predetermined threshold value, operating by the controller the fourth half-bridge leg to step up to an intermediate voltage from the DC input, wherein the intermediate voltage is in parallel with the fourth half-bridge leg.

In some implementations, the power-factor corrected AC/DC converter further comprises a DC port, the DC port which is electrically communicatively coupleable through a fourth inductor to the fourth node, the DC port which in the first mode of operation is a DC output, the method further comprising in the first mode of operation, responsive to determining the AC at the AC input is the three-phase AC, determining whether a peak voltage value of the three phase AC exceeds a predetermined threshold value, the threshold value based at least in part on a predetermined target value of a voltage of the DC output, and, responsive to determining the peak voltage value of the three phase AC at the AC input exceeds the predetermined threshold value, operating by the controller the fourth half-bridge leg to step down an intermediate voltage to the DC output, wherein the intermediate voltage is in parallel with the fourth half-bridge leg.

In some implementations, the method further comprises, responsive to determining a voltage of the AC port exceeds a predetermined threshold value, selectively electrically communicably coupling by a ninth switch a DC port to one of the fourth node through a fourth inductor, or an intermediate voltage in parallel with the first, the second, the third, and the fourth half-bridge legs.

In some implementations, the method further comprises electrically communicably coupling by a ninth switch the fourth node to the terminal of the AC port responsive to determining, by the controller, the AC at the AC input is the single-phase AC.

A power-factor corrected AC/DC converter may be summarized as comprising a first, a second, and a third half-bridge leg electrically communicatively coupled with each other to form an electrically parallel circuit, the first half-bridge leg comprising a first pair of switches, each switch of the first pair of switches electrically communicatively coupled to each other in series via a first node, the second half-bridge leg comprising a second pair of switches, each switch of the second pair of switches electrically communicatively coupled to each other in series via a second node, the third half-bridge leg comprising a third pair of switches, each switch of the third pair of switches electrically communicatively coupled to each other in series via a third node, each of the first, the second, and the third nodes electrically communicatively coupled through a first, a second, and a third inductor, respectively, to an AC input, the AC input comprising a first AC line, a fourth half-bridge leg electrically communicatively coupled with the first, the second, and the third half-bridge legs to form an electrically parallel circuit, the fourth half-bridge leg comprising a switch electrically communicatively coupled to a diode in series via a fourth node, the fourth node which in operation is electrically communicatively coupleable to a terminal of the AC input, the terminal which comprises one of an AC neutral or a second AC line, the diode which electrically communicatively couples the fourth node to a negative terminal of a DC output, wherein, in operation, current flows from the negative terminal of the DC output to the fourth node, and a controller, wherein, responsive to the controller determining an alternating current (AC) at the AC input is a single-phase AC, the controller is operable to control the first, the second, and the third half-bridge legs to operate as a 3-channel interleaved totem-pole AC/DC boost converter, electrically communicatively couple the fourth node to the terminal of the AC input, and control the fourth half-bridge leg to rectify a line frequency AC current to a DC current, and wherein, responsive to the controller determining the AC at the AC input is a three-phase AC, the controller is operable to control the first, the second, and the third half-bridge legs to operate as a 3 phase AC/DC boost converter.

In some implementations, responsive to determining the AC at the AC input is the three-phase AC, the controller is operable to cause the fourth half-bridge leg to step down an intermediate voltage to the DC output, the intermediate voltage which is in parallel with the fourth half-bridge, and a positive terminal of the DC output which is electrically communicatively coupled through a fourth inductor to the fourth node.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DEFINITION OF TERMS

Figure 1:
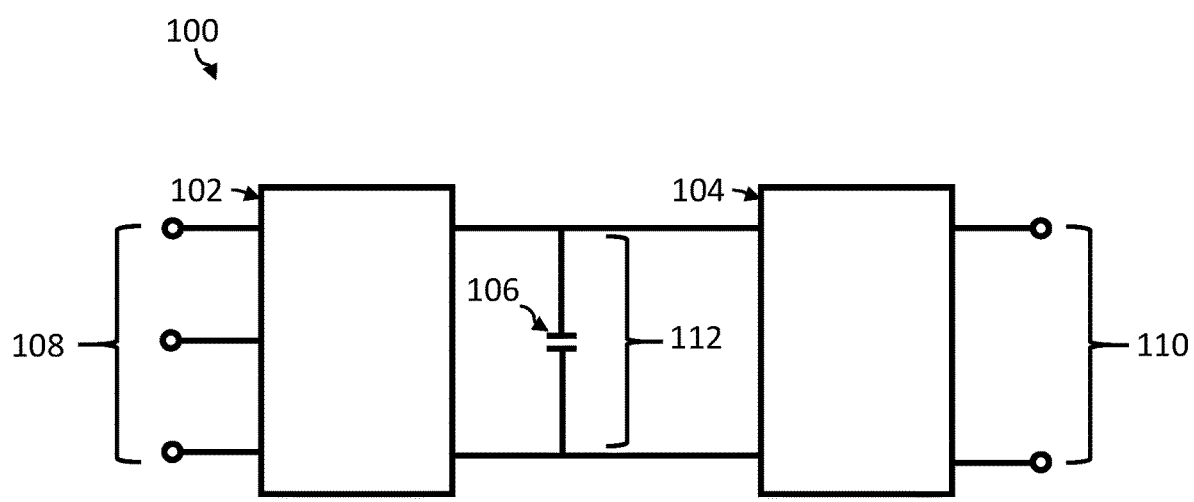
FIG. 1 is a block diagram of an example implementation of a power conversion architecture, according to the present disclosure.

AC/DC Converter: An electronic circuit or electromechanical device that converts an input of alternating current (AC) to an output of direct current (DC). An AC/DC converter can be unidirectional (transferring power only from an AC input to a DC output), or bidirectional (also able to transfer power in the reverse direction, from a DC input to an AC output)

AC Input: An AC input is an AC port electrically communicatively coupleable to a circuit that supplies an alternating current and AC input power.

AC Output: An AC output is an AC port electrically communicatively coupleable to a circuit that accepts an alternating current and AC output power.

Bidirectional Converter: An electronic circuit or electromechanical device that is operable to transfer power in two different modes or directions, by operating the input as an output, and vice versa.

DC/DC Converter: An electronic circuit or electromechanical device that converts an input source of direct current (DC) into an output of direct current (DC) which may be at a different voltage level from the input source. A resonant DC/DC converter is an example of a DC/DC converter, and includes a network of inductors and capacitors tuned to resonate at a particular frequency. A DC/DC converter can be unidirectional or bidirectional.

DC Input: A DC input is a DC port electrically communicatively coupleable to a circuit that supplies a direct current and DC input power.

DC Output: A DC output is a DC port electrically communicatively coupleable to a circuit that accepts a direct current and DC output power.

Continuous Conduction Mode (CCM): A mode of operation of an AC/DC converter in which a current does not go to zero during part of a switching cycle.

Isolated DC/DC converter: A DC/DC converter in which the input and output are electrically isolated from each other, typically using a transformer.

Line cycle: One cycle of the AC line, for example one cycle of a 50 Hz or 60 Hz cycle of an AC voltage.

MOSFET: A field-effect transistor that has a thin insulating layer of oxide on a semiconductor between the gate and the channel, and that is widely used as a switch. The semiconductor can be one of silicon, gallium nitride (GaN), and silicon carbide (SiC), for example.

Operational Amplifier (Op-Amp): A DC-coupled high-gain electronic voltage amplifier with a differential input and, usually, a single-ended output.

RMS: RMS stands for root mean square, and is defined as the square root of the mean square. For AC, RMS is equal to the value of the direct current that would produce the same average power dissipation in a resistive load.

Truly Universal PFC converter: A front-end PFC AC/DC converter that can accept both single-phase and three-phase universal AC at its input.

Universal PFC converter: A PFC AC/DC converter that can accommodate input from more than one AC mains voltage level.

Wide-bandgap (WBG) switch: A transistor switching device that includes a semiconductor material with a wider band gap than silicon, for example, silicon carbide (SiC) and gallium nitride (GaN).

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power converters, power storage devices, switches and electrical connectors, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are synonymous with "include" and variations thereof, and are to be construed in an open, inclusive sense, (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

A universal PFC converter is a PFC converter that can accommodate input from more than one AC mains voltage level. In some implementations of a universal PFC converter, the PFC converter can accept three-phase power, provide a nominal 400 VDC output (typically in a range between 385 VDC and 415 VDC), and be operable at 1-5 kW of electrical power (for example, at 3.3 kW). In other implementations, the PFC converter is operable at a higher level of electrical power, for example 6.6 kW and 10 kW. Common electric vehicle (EV) charger powers based on standard charge stations typically use 3.3 kW, 6.6 kW, and/or 10 kW. In other implementations, the PFC converter is operable at a lower level of electrical power, for example between zero and 1 kW. Three-phase operation of a PFC converter can reduce AC mains wiring costs, for example. A voltage of 400 V for DC output is common for a front-end PFC stage of certain power supplies and battery chargers.

The front-end PFC stage may be followed by an isolated direct current to direct current (DC/DC) converter using, for example in one implementation, 600 V rated silicon devices. The isolated DC/DC converter may be a bidirectional converter. Other implementations may use silicon devices with different ratings. In some implementations, wide-bandgap (WBG) devices are used because of their high efficiency relative to other types of devices. In some implementations, insulated-gate bipolar transistor (IGBT) devices may be used owing to their reduced cost and low conduction losses at high power. A 400 VDC distribution system can be favorable, for example, in data center applications.

A front-end PFC converter that can accept both single-phase and three-phase universal AC at its input is referred to in the present application as a truly-universal PFC. The present application describes a truly-universal wide-input single-phase and three-phase AC/DC bidirectional Power Factor Correction (PFC) front end converter.

In some implementations, silicon carbide (SiC) devices are used in the PFC converter. SiC devices may be selected instead of for example silicon or GaN because they have higher device voltage ratings (for example, 1200 V instead of 600 V) such as those required by some three-phase mains voltages. Example input voltages can include a single-phase line-to-neutral input voltage of 120 or 240 VAC, and a three-phase line-to-line input voltage of 208, 400, or 480 VAC. Example output voltages can include 400 VDC at 5 kW. Example applications can include battery chargers, data centers, uninterruptible power supplies (UPS), lighting, telecom rectifiers, motor drives, welders, and DC fast charging stations for EVs.

In some implementations, the truly-universal PFC converter includes four half-bridge totem pole switching legs (also referred to in the present application as half-bridge legs and half-bridge totem pole legs), a number of passive components, and two switches (e.g., electromechanical relays, or single or back-to-back semiconductor devices such as field effect transistors (FETs), insulated-gate bipolar transistors (IGBTs), or thyristors, or user-selectable manual switches or jumpers, or factory-set manual switches or jumpers). The two relays can be operated to cause the PFC converter to operate in each of three modes: a) a single-phase three-channel interleaved totem pole boost mode, b) a three-phase boost mode, and c) a cascaded three-phase boost followed by buck mode.

In some implementations, firmware can be used to operate the two relays to switch modes, and/or to adjust an intermediate bus voltage internal to the truly-universal PFC converter to maximize, or at least increase, efficiency. The intermediate bus of the truly-universal PFC converter is not the same as an intermediate bus between a PFC converter and a DC/DC converter (e.g., intermediate bus 112 of FIG. 1 described below). The intermediate bus voltage between a PFC converter and a DC/DC converter (e.g., the voltage of intermediate bus 112 of FIG. 1) is the DC output voltage of the truly-universal PFC converter. The intermediate bus voltage may be adjusted using an adaptive algorithm. An adaptive algorithm is an algorithm that changes its behavior at run-time, based on information available at the time, and optionally based on one or more criteria known in advance. Information can include historical data, resource availability, and data related to an operating environment.

A truly-universal wide-input single-phase and three-phase AC/DC bidirectional Power Factor Correction (PFC) front end converter can be sized appropriately for both single-phase and three-phase universal input, for example when the output voltage is 400 VDC. Sizing of the PFC converter can be based on a determination of losses, and current and voltage stresses in its constituent components.

A truly-universal PFC can be beneficial for kW level DC load applications, such as battery chargers and data centers. Furthermore, these applications typically require a 400 V DC output voltage, followed by a second isolated DC/DC conversion stage to meet safety requirements and in order to utilize a high bandwidth of the second isolated DC/DC conversion stage to eliminate double line frequency ripple at an output. The second isolated DC/DC conversion stage may be a bidirectional conversion stage.

A truly universal AC PFC (e.g. a truly universal PFC with a 400 V DC output) can reduce the number of products needed to accommodate various single-phase and three-phase AC mains voltages. In addition, a 400 VDC output is typical for front-end PFCs followed by an isolated DC/DC stage using 600 V switches. See, for example, F. Musavi, et al., AN LLC RESONANT DC-DC CONVERTER FOR WIDE OUTPUT VOLTAGE RANGE BATTERY CHARGING APPLICATIONS, IEEE Transactions on Power Electronics, vol. 28, pp. 5437 5445. In data center applications, a 400 VDC bus power distribution architecture can be more efficient and reliable compared to a more traditional AC distribution. See, for example, A. Pratt, et al., EVALUATION OF 400V DC DISTRIBUTION IN TELCO AND DATA CENTERS TO IMPROVE ENERGY EFFICIENCY, INTELEC 07-29th International Telecommunications Energy Conference, 2007, pp. 32 39, and A. Matsumoto, et al., DEVELOPMENT OF 400 VDC POWER DISTRIBUTION SYSTEM AND 400 VDC OUTPUT RECTIFIER, INTELEC 2009—31st International Telecommunications Energy Conference, 2009, pp. 1 5.

A truly universal AC input PFC with 400 VDC output can operate globally with both single-phase and three-phase AC mains voltages. A line-to-neutral voltage is a voltage measured between a line and neutral. A line-to-line voltage is a voltage measured between two lines. Nominal single-phase line-to-neutral voltages can typically range from 100 V to 240 VAC RMS (for example, 100 VAC in Japan, 120 VAC in the US, and 240 VAC in Europe). Nominal three-phase line-to-line voltages can typically range from 200 V to 480 VAC (for example, 208V in the US). In Canada, there is a 600V line-to-line voltage that is less common. A single-phase AC/DC PFC converter may also have as an input two AC phase line wires of a three-phase system, for example 208 VAC line-to-line in the US. A tolerance of +/−10-15% can be applied to a nominal mains line voltage, and a peak voltage is typically √2 times an RMS voltage. It is generally desirable for a DC bus voltage to be higher than the peak voltage. So, for single-phase input of 100-240 VAC line-to-neutral nominal, it is generally desirable to have a DC bus voltage of at least 385 V DC, e.g. 400 VDC nominal. For three-phase input of 200-480 VAC line-to-line nominal, it is generally desirable to have a DC bus voltage of at least 750 VDC, e.g. 800 VDC nominal.

Some three-phase front-end PFC converter implementations include a phase-modular design, and other implementations include a direct three-phase design. A phase-modular design uses three single-phase PFC converters connected in a wye or delta arrangement, while a direct three-phase design is a single integrated topology with three-phase mains input. A direct three-phase design can benefit from overlapping of phases, and may need less filtering than comparable single-phase designs. A phase-modular design may have a higher component count and concomitant higher cost than a direct three-phase design. A phase-modular three-phase design may require that a neutral wire be connected in addition to the three AC phase line wires, while a direct three-phase design may be able to run on just the three AC phase line wires without requiring a neutral wire. A typical universal input single-phase PFC converter is designed for between 85 and 265 VAC line-to-neutral, and has insufficient headroom for a three-phase nominal voltage of 480 VAC line-to-line, even if a wye connection is used to reduce it to 277 VAC line-to-neutral. Although a single-phase PFC converter could be designed to support higher line-to-neutral voltages such as 277 VAC (from a three-phase 480 VAC line-to-line system) or even 347 VAC (from a three-phase 600 VAC line-to-line system), it may require increased device voltage ratings and so higher cost and potentially higher energy losses. Also, higher input voltages may require a boost converter to have an output voltage higher than 400 VDC. At least in part for the reasons discussed above, a direct three-phase design is preferred in the present application over a phase modular design.

For regulation and PFC operation, an output DC bus voltage of a boost PFC converter must be equal to or greater than a peak value of an input voltage. For this reason, a boost converter may be unable to provide a 400 VDC output voltage for a three-phase high-line AC mains input. The term "high-line" in the present application refers to the upper end of the range of nominal voltages that might be encountered in normal operation of the PFC converter. For example, a boost converter may be able to provide a 400 VDC output with a three-phase 208 VAC line-to-line input. A boost converter may be unable to provide a 400 VDC output with a three-phase input voltage of, say, 400 VAC, 480 VAC, or 600 VAC line-to-line. Conversely, a buck PFC converter may be unable to provide a 400 VDC output voltage for a low-line AC mains input. The term "low-line" in the present application refers to the lower end of the range of nominal voltages that might be encountered in normal operation of the PFC converter. For example, a buck converter may be able to provide a 400 VDC output with a three-phase 400 VAC or 480 VAC line-to-line input. A buck converter may be unable to provide a 400 VDC output with a three-phase input voltage of 208 VAC line-to-line. Consequently, it can be desirable for a truly universal PFC converter to be able to both step up ("boost") and step down ("buck") an input voltage.

A universal PFC converter can be implemented using a single-stage or a two-stage approach. Though a single-stage PFC converter typically has a lower component count than a comparable two-stage converter, a single-stage PFC converter typically has higher current and voltage stresses on various of the components, and hence concentrated hot spots where it is more difficult to dissipate heat to keep components cool.

Some implementations of two-stage PFC converters with a universal AC input and 400 V DC output have a "boost plus buck" topology, also referred to in the present application as "boost followed by buck", which cascades or couples together in series a boost converter and a following buck converter. Other implementations have a "buck plus boost" topology. In some implementations, a first stage performs rectification and power factor correction, and a second stage performs DC/DC regulation. A three-phase buck PFC is described, for example, in J. W. K. T. Friedli, THE ESSENCE OF THREE-PHASE PFC RECTIFIER SYSTEMS-PART I, IEEE Transactions on Power Electronics, vol. 28, pp. 176 198, 2013. This converter followed by a boost stage forms a universal input three-phase PFC. Conventional "buck plus boost" converters are inherently unidirectional and cannot be used for applications requiring bidirectional power flow, for example vehicle to grid (V2G) applications unless diodes are replaced with other types of switches (for example, active switches used in a synchronous buck converter). A bidirectional three-phase buck PFC converter which combines two separate buck PFC converters in opposing directions is described in M. F. Vancu et al., COMPARATIVE EVALUATION OF BIDIRECTIONAL BUCK-TYPE PFC CONVERTER SYSTEMS FOR INTERFACING RESIDENTIAL DC DISTRIBUTION SYSTEMS TO THE SMART GRID, IECON 2012—38th Annual Conference on IEEE Industrial Electronics Society, pp. 5153 5160. Disadvantages include an increase in hardware costs relative to a conventional unidirectional buck, and a limitation that only one converter is working at a given time, leading to low power density.

A three-phase six-switch boost PFC converter followed by a synchronous buck DC/DC converter is a bidirectional two-stage topology that is suitable for a universal three-phase AC input PFC with 400 VDC. Component stress can be less than for a single-stage three-phase PFC, and the topology can be well-suited to bidirectional high power applications, for example battery chargers requiring V2G, grid-tied solar inverters with battery energy storage, and data centers. Furthermore, by using adaptive control of an intermediate bus voltage between the boost PFC converter and the buck DC/DC converter, an efficiency of the topology can be improved in comparison to a conventional topology that has an 800 VDC intermediate bus between the boost PFC and buck stages.

Single-phase PFC converters commonly use a conventional diode bridge boost PFC topology. While this topology can be reliable, it can suffer from efficiency and thermal issues owing to high conduction losses in the diode bridge rectifier. The topology is also unidirectional. Bridgeless PFC converter topologies have been developed to overcome at least some of the efficiency and thermal issues, by reducing diode conduction losses, and allowing bidirectional operation. Some bridgeless PFC converter topologies, for example the totem pole boost PFC converter, operate their switches in a way that can induce significant reverse recovery losses in switches that have slow intrinsic body diodes, such as silicon super junction MOSFETs. These losses can make it impractical for a totem pole boost PFC converter with silicon MOSFETs to operate in continuous conduction mode (CCM). This limitation can reduce the power density that can be economically achieved with practical cooling. In contrast, wide bandgap (WBG) devices, for example silicon carbide (SiC) or gallium nitride (GaN) switches, typically have very low reverse recovery losses, allowing a totem pole boost PFC converter to operate in CCM with advantageous efficiency and power density.

Interleaving can help to increase a nominal power of the converter, reduce current ripple amplitude, and increase ripple frequency, reducing EMI filter requirements. One implementation includes a two-channel interleaved bridgeless totem pole boost PFC. See, for example, Y. Tang et al., A BRIDGELESS TOTEM-POLE INTERLEAVED PFC CONVERTER FOR PLUG-IN ELECTRIC VEHICLES, 2016 IEEE Applied Power Electronics Conference and Exposition (APEC), pp. 440-445. At least in part for this reason, an interleaved totem-pole topology can have advantages over a conventional diode bridge boost PFC, and can be particularly suitable for a bidirectional universal AC input single-phase PFC with 400V DC output.

The present application describes a truly-universal AC input PFC topology that combines advantages of single-phase and three-phase universal AC input PFC converters. The present topology includes a three-channel interleaved totem-pole boost PFC mode, a three-phase boost PFC mode, and a cascaded three-phase boost PFC followed by a buck DC/DC converter mode, and uses relays to switch between operating modes.

FIG. 1 is a block diagram of an example implementation of a power conversion architecture 100, according to the present disclosure. Power conversion architecture 100 comprises a front-end power factor correction (PFC) AC/DC converter 102 (also referred to in the present application as a front-end PFC stage), an isolated DC/DC converter 104, and a capacitor 106.

Front-end PFC AC/DC converter 102 is electrically communicably coupleable to a universal three-phase alternating current (AC) input 108. In some implementations, a line-to-line RMS voltage of universal three-phase AC input 108 ranges from 200 VAC to 480 VAC nominal. In practice, operating range of front-end PFC AC/DC converter 102 includes tolerances of typically +/−10-15%. For example, a line-to-line RMS voltage of universal three-phase AC input 108 may range from 170 VAC to 550 VAC.

Isolated DC/DC converter 104 is electrically communicably coupled to a DC output 110. In various implementations, a voltage of DC output 110 may range from 12 VDC to 400 VDC nominal. In one implementation, for example, a voltage of DC output 110 is 12 VDC nominal. In another implementation, for example, a voltage of DC output 110 is 400 VDC.

Front-end PFC converter 102 is electrically communicably coupled to isolated DC/DC converter 104 by an intermediate DC bus 112. In some implementations, a nominal voltage of intermediate DC bus 112 is 400 VDC. In some implementations, front end PFC AC/DC converter 102 is a bidirectional AC/DC converter, and isolated DC/DC converter 104 is a bidirectional DC/DC converter.

Figure 2A:
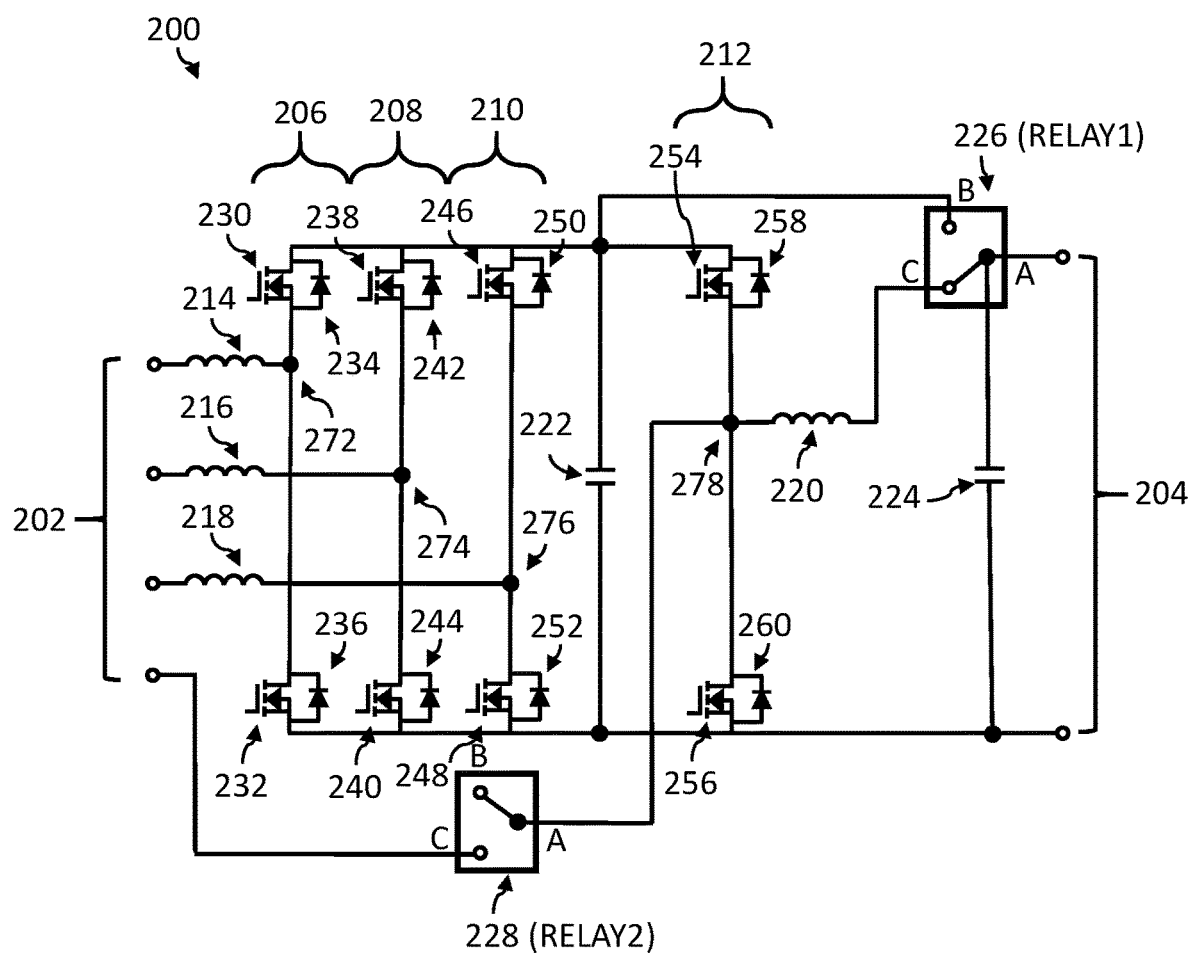
FIG. 2A is a schematic diagram of an example implementation of a truly universal PFC converter, according to the present disclosure.

FIG. 2A is a schematic diagram of an example implementation of a truly universal PFC converter 200, according to the present disclosure. PFC converter 200 receives an input AC mains voltage at input 202, and provides an output DC voltage at output 204.

PFC converter 200 comprises four half-bridge totem pole legs 206, 208, 210, and 212, four inductors 214, 216, 218, and 220, two capacitors 222 and 224, and two relays 226 and 228.

Half-bridge totem pole leg 206 comprises switches 230 and 232, and diodes 234 and 236. It is noted that the diodes discussed herein may be also referred to as switches. Switch 230 is electrically in anti-parallel with diode 234. Switch 232 is electrically in anti-parallel with diode 236. In the present application, two devices are said to be electrically in anti-parallel with each other if the two devices are electrically communicatively coupled to each other with their polarities reversed. The parallel combination of switch 230 and diode 234 is electrically communicatively coupled in series with the parallel combination of switch 232 and diode 236 via a node 272. Inductor 214 is electrically communicatively coupled to node 272 of half-bridge totem pole leg 206.

Half-bridge totem pole leg 208 comprises switches 238 and 240, and diodes 242 and 244. Switch 238 is electrically in anti-parallel with diode 242. Switch 240 is electrically in anti-parallel with diode 244. The parallel combination of switch 238 and diode 242 is electrically communicatively coupled in series with the parallel combination of switch 240 and diode 244 via a node 274. Inductor 216 is electrically communicatively coupled to node 274 of half-bridge totem pole leg 208.

Half-bridge totem pole leg 210 comprises switches 246 and 248, and diodes 250 and 252. Switch 246 is electrically in anti-parallel with diode 250. Switch 248 is electrically in anti-parallel with diode 252. The parallel combination of switch 246 and diode 250 is electrically communicatively coupled in series with the parallel combination of switch 248 and diode 252 via a node 276. Inductor 218 is electrically communicatively coupled to node 276 of half-bridge totem pole leg 210.

Half-bridge totem pole leg 212 comprises switches 254 and 256, and diodes 258 and 260. Switch 254 is electrically in anti-parallel with diode 258. Switch 256 is electrically in anti-parallel with diode 260. The parallel combination of switch 254 and diode 258 is electrically communicatively coupled in series with the parallel combination of switch 256 and diode 260 via a node 278. Inductor 220 is electrically communicatively coupled to node 278 of half-bridge totem pole leg 212.

In some implementations, the anti-parallel diodes in parallel with the switches are intrinsic body diodes of the switches, or diodes co-packaged with the switches. In some implementations, external anti-parallel diodes are connected in addition to or instead of intrinsic switch body diodes. In some implementations, switches 254 and 256 are removed from half-bridge totem pole leg 212, while diodes 258 and 260 remain. In these implementations, each of diodes 258 and 260 is electrically communicatively coupled in series with each other via node 278.

Relay 226 is also referred to in the present application (for example in TABLE 1) as RELAY1, and relay 228 is also referred to in the present application (for example in TABLE 1) as RELAY2. The states of relays 226 and 228 can be changed to cause PFC converter 200 to operate in three different modes to achieve PFC and a 400 VDC output. The three operating modes are i) a single-phase three-channel interleaved totem pole mode, ii) a three-phase boost mode, and iii) a cascaded three-phase boost plus buck mode.

Table 1 lists each of the three operating modes and the respective state of the relays. In some implementations, the PFC AC/DC converter is bidirectional, and the three operating modes of Table 1 are also operable for reverse DC to AC power conversion.

TABLE 1

OPERATING MODES OF A TRULY UNIVERSAL PFC CONVERTER

| AC mains voltage | RELAY 1 | RELAY 2 | Mode of Operation |
|---|---|---|---|
| Single-phase 100 V, 120 V, 240 V line-to-neutral Single-phase 208 V line-to-line | AB | AC | Single-phase three-channel interleaved totem pole boost PFC |
| Three-phase 200 V, 208 V line-to-neutral | AB | AB | Three-phase boost PFC |
| Three-phase 400 V, 480 V line-to-neutral | AC | AB | Cascaded three-phase boost PFC plus buck |

In some implementations, switches 230, 232, 238, 240, 246, 248, 254, and 256 are 1200V Silicon Carbide (SiC) switches. In some implementations, switches 230, 232, 238, 240, 246, and 248, can be driven using a six-channel driver, for example a Cree CGD15FB45P driver. In some implementations, switches 254 and 256 can be driven using a two-channel driver, for example a Cree CRD8FF1217P driver.

Figure 2B:
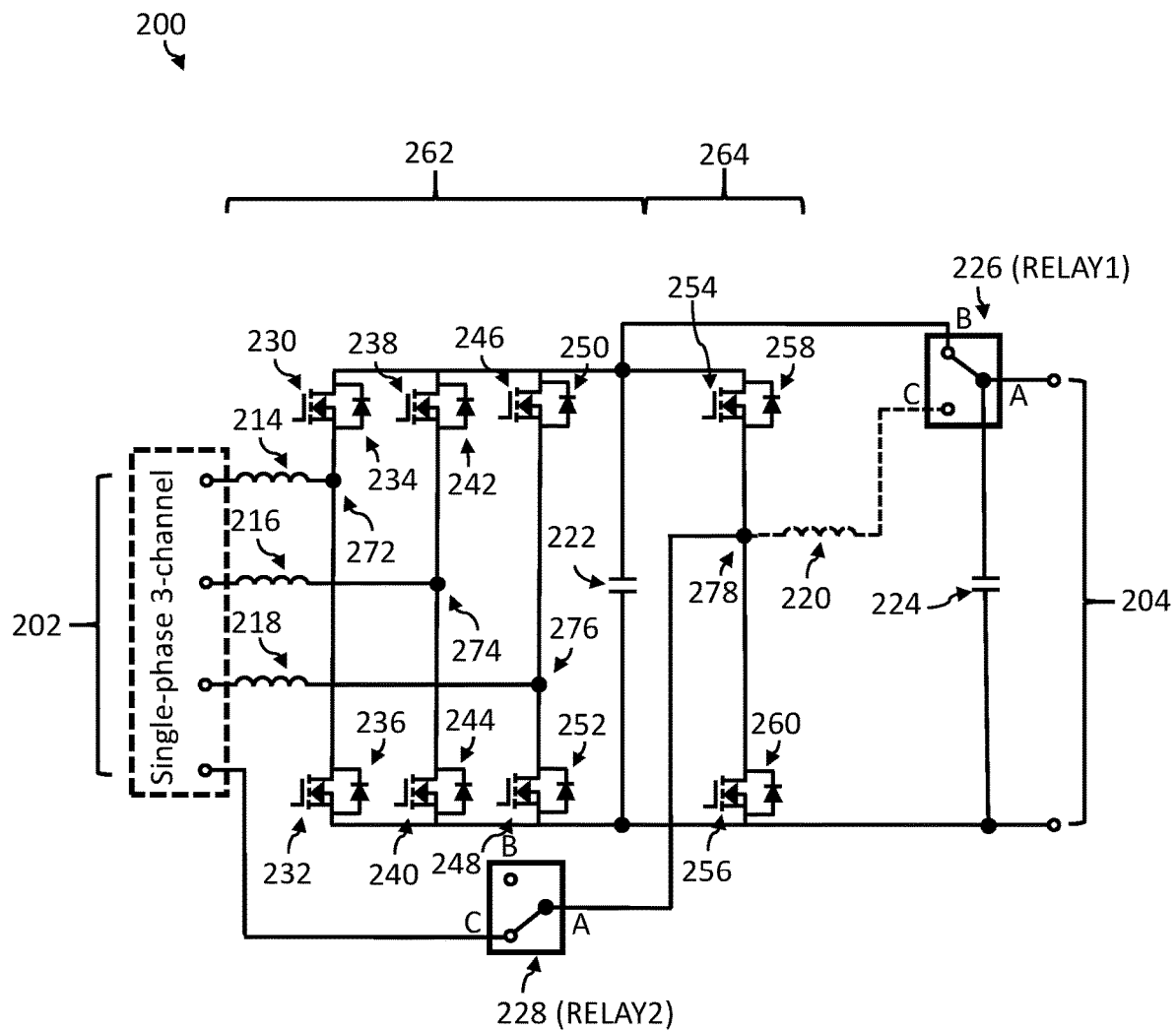
FIG. 2B is a schematic diagram of the truly universal PFC converter of FIG. 2A operating in a single-phase three-channel interleaved totem pole boost mode, according to the present disclosure.

FIG. 2B is a schematic diagram of truly universal PFC converter 200 of FIG. 2A operating in a single-phase three-channel interleaved totem pole boost PFC converter mode, according to the present disclosure. In some implementations, the PFC converter is bidirectional, and is also operable for reverse DC to AC power conversion, in a single-phase three-channel interleaved buck DC/AC PFC converter mode. The same reference numbers are used in FIG. 2B to identify elements that are the same or substantially similar to elements in FIG. 2A.

In practice, with single-phase wiring, each of line, neutral, and earth ground can be electrically communicatively coupled by a respective wire to truly universal PFC converter 200 of FIG. 2B. Earth ground is not shown in FIG. 2B. In practice, PFC converter 200 of FIG. 2B can have a dedicated connection or screw terminal for earth ground. An AC phase line wire can be electrically communicatively coupled to each of the three interleaved channels i.e., the first three input terminals. In one implementation, the line wire is electrically communicatively coupled to one of the first three input terminals, and wires, jumpers, or a copper bar used to short the first input terminal to the other two input terminals. A neutral wire or a second AC phase line wire can be electrically communicatively coupled to a fourth input terminal of input 202.

Relay 226 (also referred to in the present application as RELAY1) is set in the AB position, and relay 228 (also referred to in the present application as RELAY2) is set in the AC position, as indicated in TABLE 1. In some implementations, switches 230, 232, 238, 240, 246, and 248 are high-frequency MOSFETs, and switches 254 and 256 are line-frequency MOSFETs that provide a return current path for line current in the negative and positive half cycles, respectively.

In FIG. 2B, a portion 262 of PFC converter 200 includes three interleaved channels of switches operated at high-frequency (for example, 50 kHz PWM), and a portion 264 of PFC converter 200 includes a pair of switches operated at the mains line frequency (for example, 50 or 60 Hz).

In a boost converter maintaining PFC, an output DC bus voltage is typically equal to or greater than a peak value of an AC input voltage as given by:

$$V_{bus} \geq \sqrt{2} V_{in}$$

where $V_{bus}$ is the output DC bus voltage, and $V_{in}$ is the RMS line-to-neutral voltage in a single-phase mode of operation of the PFC converter, and line-to-line voltage in a three-phase mode of operation of the PFC converter.

For single-phase input with, for example, a 400 VDC output DC bus, the high-line peak voltage (assuming, for example, a 10% overvoltage) is less than 400 V, and PFC can be guaranteed over an entire input range. Regulation can be achieved without a second stage to step the voltage down to 400 VDC. For a high-line three-phase input (for example, 400 VAC, 480 VAC, or 600 VAC RMS line-to-line), the PFC converter typically has a second stage to step the voltage down to 400 VAC.

Figure 2C:
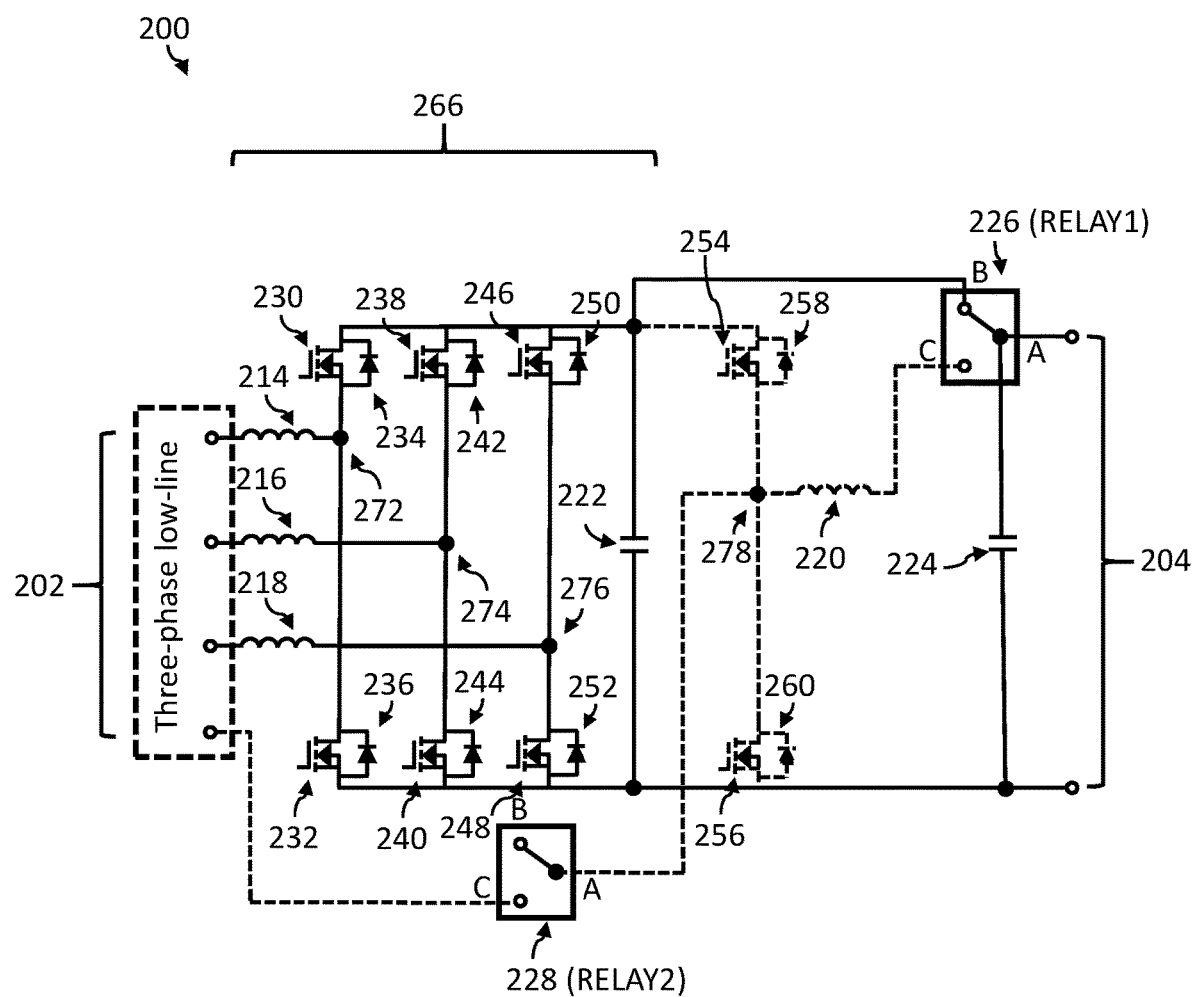
FIG. 2C is a schematic diagram of the truly universal PFC converter of FIG. 2A operating in a three-phase boost mode, according to the present disclosure.

FIG. 2C is a schematic diagram of the truly universal PFC converter 200 of FIG. 2A operating in a three-phase boost PFC converter mode, according to the present disclosure. In some implementations, the converter is bidirectional, and also operable for reverse DC to AC power conversion, in a three-phase buck DC/AC PFC converter mode. The same reference numbers are used in FIG. 2C to identify elements that are the same or substantially similar to elements in FIG. 2A.

Relay 226 (also referred to in the present application as RELAY1) is set in the AB position, and relay 228 (also referred to in the present application as RELAY2) is set in the AB position, as indicated in TABLE 1. The three-phase boost mode can be suitable for three-phase low-line AC mains, i.e., where the peak of the line-to-line voltage is less than 400 V, for example 208 VAC RMS line-to-line.

In FIG. 2C, a portion 266 of PFC converter 200 includes three sets of switches operated at high-frequency (for example, 50 kHz PWM), and is also referred to in the present application as three-phase boost PFC converter 266.

Figure 2D:
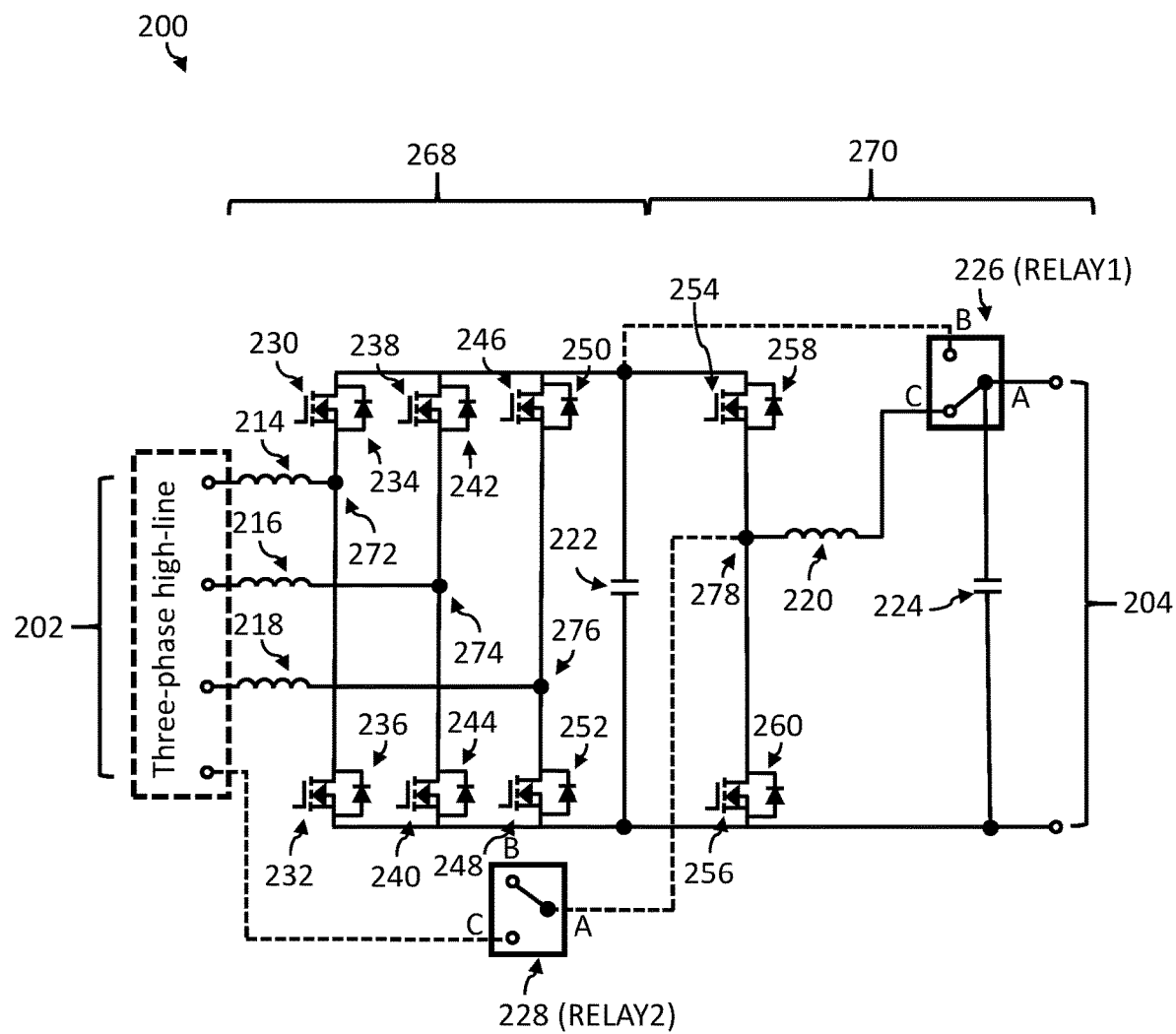
FIG. 2D is a schematic diagram of the truly universal PFC converter of FIG. 2A operating in a cascaded three-phase boost followed by buck mode, according to the present disclosure.

FIG. 2D is a schematic diagram of truly universal PFC converter 200 of FIG. 2A operating in a cascaded three-phase boost followed by buck mode, according to the present disclosure. In some implementations, the converter is bidirectional, and also operable for reverse DC to AC power conversion, in a cascaded boost followed by three-phase buck DC/AC PFC converter mode. The same reference numbers are used in FIG. 2D to identify elements that are the same or substantially similar to elements in FIG. 2A.

Relay 226 (also referred to in the present application as RELAY1) is set in the AC position, and relay 228 (also referred to in the present application as RELAY2) is set in the AB position, as indicated in TABLE 1. The cascaded three-phase boost followed by buck mode can be suitable for three-phase high-line AC mains, i.e., where the peak of the line-to-line voltage is greater than 400V, for example 400 VAC or 480 VAC RMS line-to-line. In some implementations of truly universal PFC converter 200 of FIG. 2A operating in a cascaded three-phase boost followed by buck mode as shown in FIG. 2D, an intermediate bus voltage can be changed adaptively in order to maximize, or at least increase, efficiency.

In FIG. 2D, a portion 268 of PFC converter 200 includes three pairs of switches operated at high frequency (for example, 50 kHz PWM), and is also referred to in the present application as three-phase boost PFC converter 268. A portion 270 of PFC converter 200 includes a pair of switches operated at high frequency (for example, 50 kHz PWM), and is also referred to in the present application as buck converter 270.

Boost inductors, such as the one or more of the inductors 214, 216, and 218, can be sized based at least in part on a maximum target ripple current and a maximum power level. Sizing a boost inductor can include selecting a magnet wire gauge, a core size and a core material. The maximum ripple can be used to determine core loss, and can affect sizing of an EMI input filter.

In PFC converter 200 of FIG. 2A, a maximum inductor ripple current can be similar for both single-phase and three-phase operation, and the same size of boost inductor can be suitable for both operating modes.

For single-phase input, the following equations govern a minimum inductor size and a maximum current ripple, respectively:

$$L_{min} = \frac{V_{ac,min}^2}{P_0 r f_{sw}}\left(1 - \frac{\sqrt{2}V_{ac,min}}{V_0}\right)$$

$$I_{Lmax} = \frac{\sqrt{2}P_0}{V_{ac,min}}\left(1 + \frac{r}{2}\right)$$

where $P_0$ is the power processed in each channel, $V_{ac,min}$ is the low-line input voltage, r is a ripple percentage, $f_{sw}$ is a switching frequency, and $V_0$ is an output voltage.

In an example implementation, where $P_0$=1.67 kW, $V_{ac,min}$=85 V, r=0.15, $f_{sw}$=50 kHz, and $V_0$=400 V, the boost inductor can be sized at 500 µH.

Similarly, a maximum inductor ripple in a boost converter with three-phase input voltage can be estimated analytically using the following equation:

$$I_{ripple\_max} = \frac{V_{DC}}{f_{sw}6L}M$$

where L is the boost inductor, M is a modulation index, $V_{DC}$ is a DC output voltage, and $f_{sw}$ is a switching frequency.

Using the values from the single-phase example implementation above, the boost inductor can be 500 µH, and the maximum inductor ripple can be estimated to be 4.98 A.

The estimated maximum inductor ripple can be similar for both single-phase and three-phase operation of a boost converter, and so the same size of boost inductor can be suitable for both single-phase and three-phase operation.

The value of a buck inductor, such as the inductor 220, can be estimated analytically using the following equation:

$$L_f = \frac{V_O(1-D)}{\Delta i_L f_{sw}}$$

where $V_O$ is a buck output voltage, D is a buck steady-state duty cycle, $f_{sw}$ is a buck switching frequency, and $\Delta i_L$, is a peak-to-peak inductor ripple current.

Using example values consistent with the example implementation above, the estimated buck inductor is 500 µH.

In some implementations, boost stage output capacitors are sized based, at least in part, on a ripple voltage, and voltage and current stresses. In some implementations, boost stage output capacitors are sized based, at least in part, on hold-up time and/or lifetime requirements.

In a single-phase interleaved operation, for example with a single-phase boost PFC, an instantaneous power P(t) can be expressed as follow in terms of a DC term $P_0$ and an AC component that has a frequency of twice the AC line input:

$$P(t)=P_0+P_0 \cos 2\omega t$$

In some implementations, an output power can be assumed to be at least approximately constant, and the instantaneous power can be stored and released by an output capacitor. In an example implementation where a boost converter output voltage is 400 V, the output power is 5 kW, and an output double-line frequency ripple peak-to-peak voltage is 25 V, the output capacitor can be selected to have a value of 1,325 µF to compensate for the variable AC component.

In the same example implementation, an output capacitor current stress is estimated to be 8.99 A.

In three-phase boost or three-phase boost with cascaded buck operation, for example with a balanced three-phase PFC circuit, the instantaneous output power can be at least approximately constant:

$$P(t)=P_a(t)+P_b(t)+P_c(t)=\text{constant}$$

The output capacitor can compensate for a distortion power associated with a high frequency ripple in phase currents. In an example implementation using parameters from earlier example implementations (see above), and where the DC output voltage is 800 V, a suitable value for the output capacitor can be estimated to be 4.3 µF.

In some implementations, for practical considerations, the output capacitor may be oversized to handle unbalanced AC mains voltages, de-rating, or loss of one phase. To allow for loss of one phase, the output capacitor of the previous example can be oversized to 766 µF with an estimated concomittant current stress of approximately 13.72 A.

In general, and as seen in the examples described above, a larger output capacitance may be more suitable for single-phase AC input operation than three-phase operation. Selecting a suitable output capacitor for single-phase operation may result in the selected output capacitor being over-designed for three-phase operation. In some implementations, it can be desirable to oversize the capacitor to allow for other practical considerations e.g. product lifetime and operating temperature range.

In an example implementation, NRB-XW 450V 150 g electrolytic capacitors manufactured by NIC Components Corp. with a current stress capacity of 1.42 A each may be included in an array of 18 parallel capacitors with two series 450 V, 150 g capacitors in each parallel leg, resulting in a capacitance of 1,350 µF.

A suitable value for an output capacitor for a buck stage may be estimated. In an example implementation where duty cycle D=0.5, inductance $L_f$=500 µH, switching frequency $f_{sw}$=50 kHz, output voltage $V_O$=400 V, and output voltage ripple is 20 V, a suitable value for the output capacitor can be 1 µF.

The capacitor current stress is essentially the same as an RMS ripple current of the inductor, and in this example can be estimated to be 2.31 A. In some implementations, for practical considerations e.g. hold-up time and lifetime, the output capacitor may be oversized. In an example implementation, two 330 µF electrolytic capacitors are arranged in series to provide an output capacitance of 165 µF.

Active components of the truly universal PFC converter 200 of FIG. 2A can be sized based, at least in part, on an estimate of voltage and current stresses for a full load output power (e.g. for a full load 5 kW output power). In some implementations, active components include low-loss SiC MOSFETs and diodes.

In some implementations, active and passive components are selected using a worst-case stress analysis and loss estimation. Parameters of interest for active and passive components may include a drain-to-source resistance of MOSFETs, a dynamic resistance of a diode, a diode forward voltage drop, a gate external resistance, DC and AC resistances of inductor coils, a capacitor equivalent-series-resistance, and inductor core loss coefficients.

Switches 230, 232, 238, 240, 246, 248, 254, and 256, and diodes 258 and 260 can see the highest current stress at three-channel interleaved single-phase mode of operation with low-line input voltage (e.g., 100 or 120 VAC line-to-neutral). Diodes 234, 236, 242, 244, 250, and 252 have the highest current stress in three-phase boost mode of operation.

The voltage stress across active components in the boost and buck stages can be clamped to an intermediate bus voltage (e.g. clamped to 800 V).

Figure 2E:
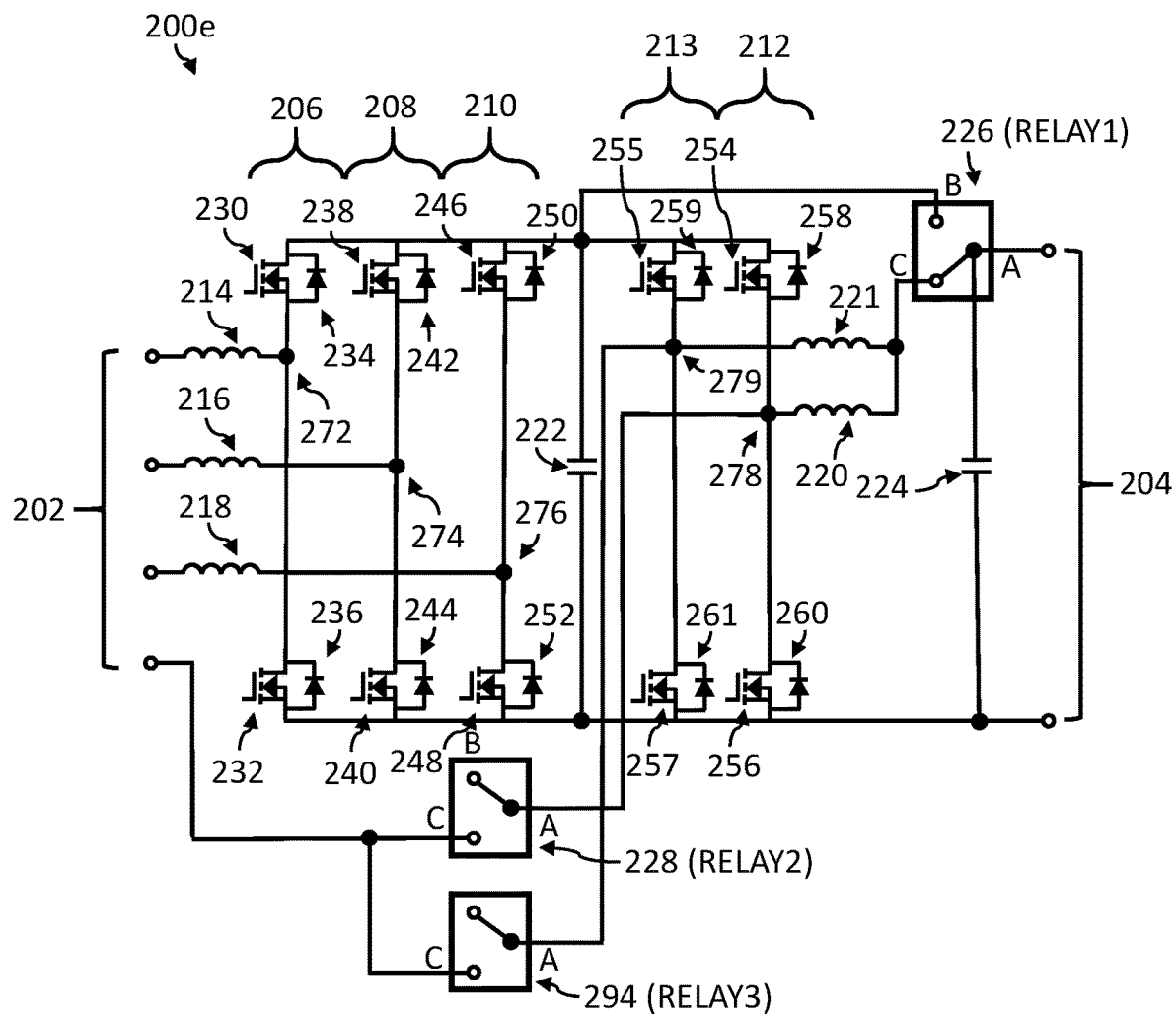
FIG. 2E is a schematic diagram of another example implementation of a truly universal PFC converter, according to the present disclosure.

FIG. 2E is a schematic diagram of another example implementation of a truly universal PFC converter 200e, according to the present disclosure. PFC converter 200e includes the same elements as PFC converter 200, and further includes a fifth half-bridge totem pole leg 213.

Half-bridge totem pole leg 213 comprises switches 255 and 257, and diodes 259 and 261. Switch 255 is electrically in anti-parallel with diode 259. Switch 257 is electrically in anti-parallel with diode 261. The parallel combination of switch 255 and diode 259 is electrically communicatively coupled in series with the parallel combination of switch 257 and diode 261 via a node 279. Inductor 221 is electrically communicatively coupled to node 279 of half-bridge totem pole leg 213.

Half-bridge totem pole leg 213 is electrically communicatively coupled in parallel with half-bridge totem pole legs 206, 208, and 210. In operation, node 279 is electrically communicatively coupleable to AC input 202. Half-bridge totem pole leg 213 is electrically communicatively coupled in parallel with the half-bridge totem pole leg 212. In some implementations, PFC converter 200e is operable to control half-bridge totem pole legs 212 and 213 as an interleaved buck converter.

In single-phase operation, half-bridge totem pole leg 212 of PFC converter 200 can carry a combined return current for half-bridge totem pole legs 206, 208, and 210. PFC converter 200e can achieve higher currents and powers than PFC converter 200 because half-bridge totem pole legs 212 and 213 can share current and spread heat loss, for example.

PFC converter 200e optionally includes a relay 294 (RELAY3). Relay 294 can provide a separate AC return for half-bridge totem pole leg 213 in single-phase operation, and can electrically disconnect node 279 from node 278 in three-phase operation when operating the buck converter in an interleaved mode. In another implementation, relay 228 is a double-pole relay.

Figure 2F:
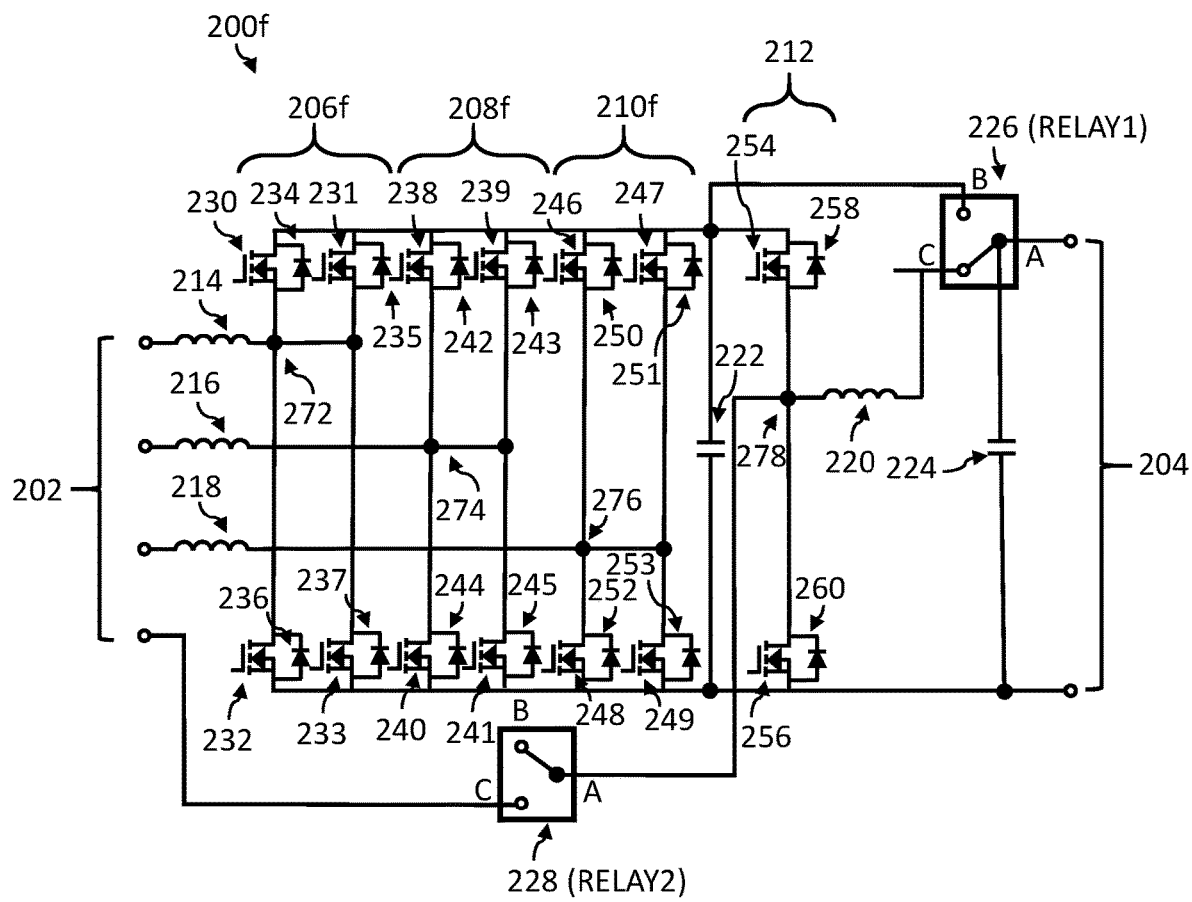
FIG. 2F is a schematic diagram of another example implementation of a truly universal PFC converter, according to the present disclosure.

FIG. 2F is a schematic diagram of another example implementation of a truly universal PFC converter 200f, according to the present disclosure. PFC converter 200f includes the same elements as PFC converter 200, and further includes parallel switches in each of half-bridge totem pole legs 206f, 208f, and 210f as described in more detail below.

Half-bridge totem pole leg 206f comprises a switch 231 electrically in anti-parallel with a diode 235, both switch 231 and diode 235 electrically in parallel with switch 230 and diode 234. Half-bridge totem pole leg 206f further comprises a switch 233 electrically in anti-parallel with a diode 237, both switch 233 and diode 237 electrically in parallel with switch 232 and diode 236.

Half-bridge totem pole leg 208f comprises a switch 239 electrically in anti-parallel with a diode 243, both switch 239 and diode 243 electrically in parallel with switch 238 and diode 242. Half-bridge totem pole leg 208f further comprises a switch 241 electrically in anti-parallel with a diode 245, both switch 241 and diode 245 electrically in parallel with switch 240 and diode 244.

Half-bridge totem pole leg 210f comprises a switch 247 electrically in anti-parallel with a diode 251, both switch 247 and diode 251 electrically in parallel with switch 246 and diode 250. Half-bridge totem pole leg 210f further comprises a switch 249 electrically in anti-parallel with a diode 253, both switch 249 and diode 253 electrically in parallel with switch 248 and diode 252.

PFC converter 200f can achieve higher currents and powers than PFC converter 200 because the paralleled switches and diodes in half-bridge totem pole legs 206f, 208f, and 210f can share current and spread heat loss, for example.

Figure 2G:
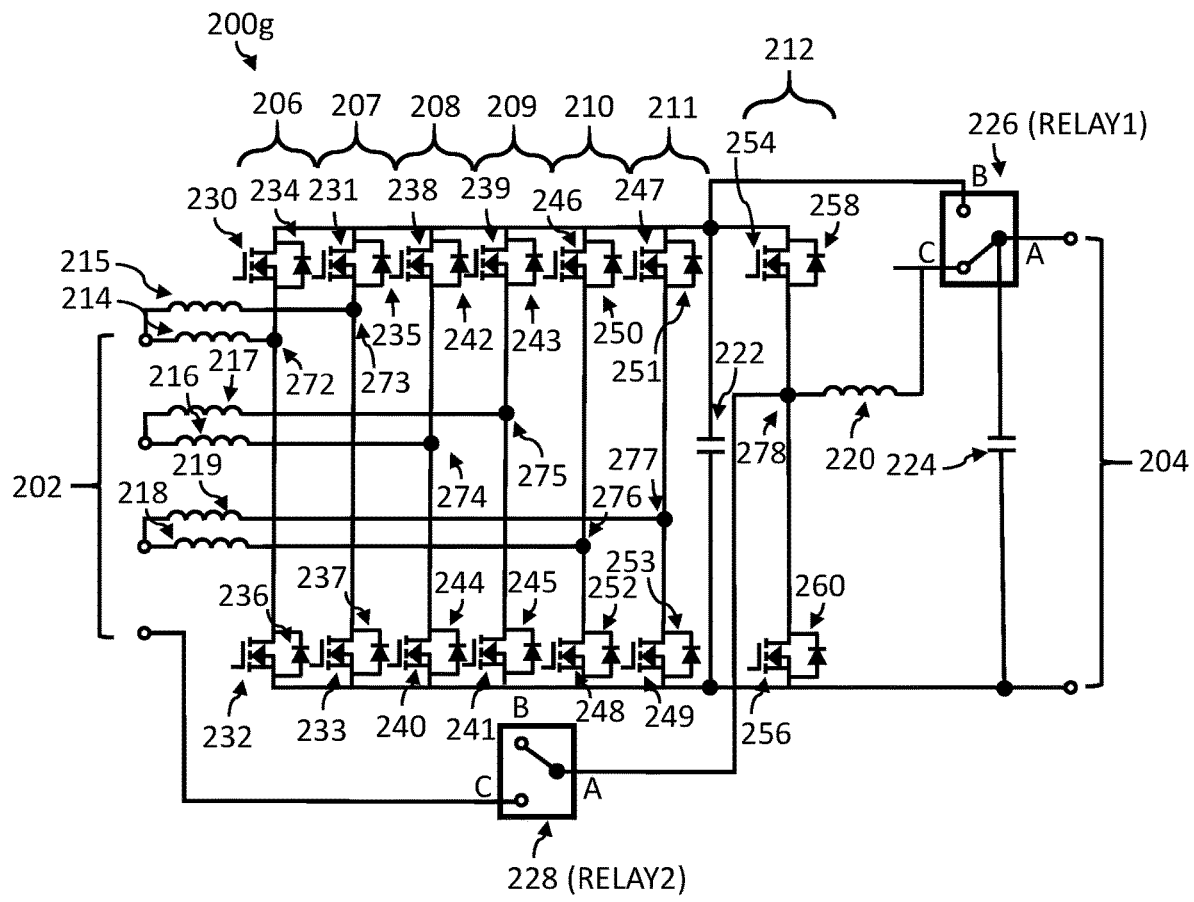
FIG. 2G is a schematic diagram of another example implementation of a truly universal PFC converter, according to the present disclosure.

FIG. 2G is a schematic diagram of another example implementation of a truly universal PFC converter 200g, according to the present disclosure. PFC converter 200g includes the same elements as PFC converter 200, and further includes inductors 215, 217, and 219 which electrically communicatively couple half-bridge totem pole legs 207, 209, and 211, respectively, to AC input 202.

Half-bridge totem pole leg 207 comprises switches 231 and 233, and diodes 235 and 237. Switch 231 is electrically in anti-parallel with diode 235. Switch 233 is electrically in anti-parallel with diode 237. The parallel combination of switch 231 and diode 235 is electrically communicatively coupled in series with the parallel combination of switch 233 and diode 237 via a node 273. One end of inductor 215 is electrically communicatively coupled to node 273 of half-bridge totem pole leg 207. The other end of inductor 215 is electrically communicatively coupled to inductor 214 at AC input 202.

Half-bridge totem pole leg 209 comprises switches 239 and 241, and diodes 243 and 245. Switch 239 is electrically in anti-parallel with diode 243. Switch 241 is electrically in anti-parallel with diode 245. The parallel combination of switch 239 and diode 243 is electrically communicatively coupled in series with the parallel combination of switch 241 and diode 245 via a node 275. One end of inductor 217 is electrically communicatively coupled to node 275 of half-bridge totem pole leg 209. The other end of inductor 217 is electrically communicatively coupled to inductor 216 at AC input 202.

Half-bridge totem pole leg 211 comprises switches 247 and 249, and diodes 251 and 253. Switch 247 is electrically in anti-parallel with diode 251. Switch 249 is electrically in anti-parallel with diode 253. The parallel combination of switch 247 and diode 251 is electrically communicatively coupled in series with the parallel combination of switch 249 and diode 253 via a node 277. One end of inductor 219 is electrically communicatively coupled to node 277 of half-bridge totem pole leg 211. The other end of inductor 219 is electrically communicatively coupled to inductor 218 at AC input 202.

Half-bridge totem pole legs 207, 209, and 211 are electrically communicatively coupled in parallel with half-bridge totem pole legs 206, 208, and 210. In operation, inductors 215, 217, and 219 are electrically communicatively coupleable to AC input 202, such that inductors 214 and 215 share an AC line connection, inductors 216 and 217 share an AC line connection, and inductors 218 and 219 share an AC line connection.

In single-phase operation, an AC line can be connected to all six inductors 214, 215, 216, 217, 218, and 219, such that all six half-bridge totem pole legs 206, 207, 208, 209, 210, and 211 can share the AC input current. In some implementations, PFC converter 200g is operable to control half-bridge totem pole legs 206, 207, 208, 209, 210, and 211 as a 6-channel interleaved boost PFC converter.

In three-phase operation, a first AC line can be connected to inductors 214 and 215, a second AC line can be connected to inductors 216 and 217, and a third AC line can be connected to inductors 218 and 219, such that half-bridge totem pole legs 206 and 207 can share the first AC line current, legs 208 and 209 can share the second AC line current, and legs 210 and 211 can share the third AC line current. In some implementations, PFC converter 200g is operable to control half-bridge totem pole legs 206, 207, 208, 209, 210, and 211 as an interleaved 3-phase boost PFC converter, where legs 206 and 207 are interleaved with each other, legs 208 and 209 are interleaved with each other, and 208 and 209 are interleaved with each other.

PFC converter 200g can achieve higher currents and powers than PFC converter 200 because inductors 214, 215, 216, 217, 218, and 219, and half-bridge totem pole legs 206, 207, 208, 209, 210, and 211 can share current and spread heat loss, for example.

Figure 2H:
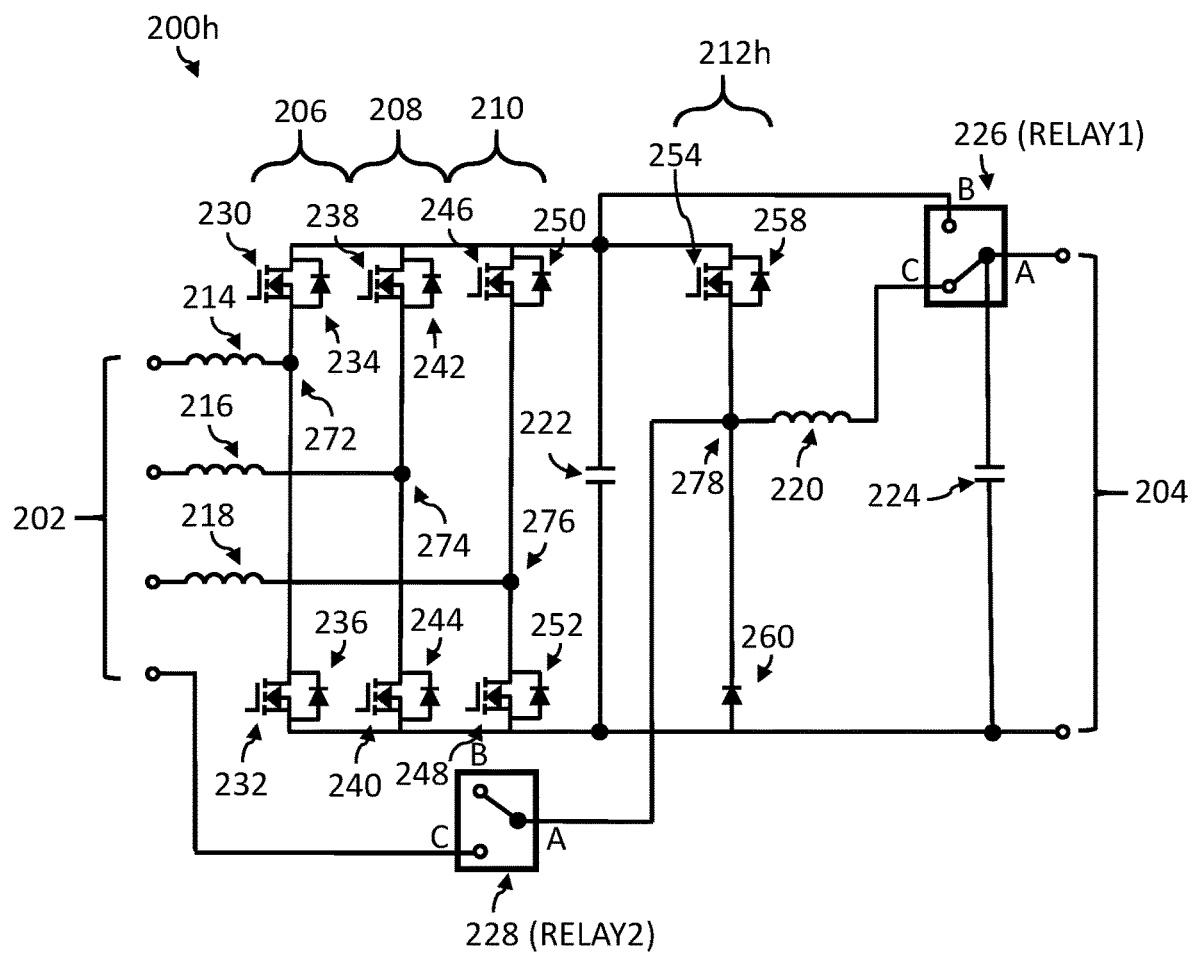
FIG. 2H is a schematic diagram of another example implementation of a truly universal PFC converter, according to the present disclosure.

FIG. 2H is a schematic diagram of another example implementation of a truly universal PFC converter 200h, according to the present disclosure. PFC converter 200h includes the same elements as PFC converter 200 with the exception of switch 256.

Half-bridge totem pole leg 212h comprises switch 254, and diodes 258 and 260. Switch 254 is electrically in anti-parallel with diode 258. The parallel combination of switch 254 and diode 258 is electrically communicatively coupled in series with diode 260 via a node 278. Diode 260 is oriented such that current can flow through diode 260 into node 278. Inductor 220 is electrically communicatively coupled to node 278 of half-bridge totem pole leg 212h. Half-bridge totem pole leg 212h is electrically communicatively coupled in parallel with half-bridge totem pole legs 206, 208, and 210. In operation, node 278 is electrically communicatively coupleable to AC input 202.

Both PFC converter 200h and PFC converter 200 are operable as a single-phase 3-channel interleaved boost PFC converter, a three-phase boost PFC converter, and a cascaded three-phase boost converter followed by a buck converter. PFC converter 200h is capable of AC to DC conversion. PFC converter 200 includes switch 256 in half-bridge totem pole leg 212, and is capable of bidirectional operation, i.e., AC to DC conversion and DC to AC conversion. In single-phase operation, half-bridge totem pole leg 212 is operable both to rectify AC current to DC current, and to invert DC current to AC current; half-bridge totem pole leg 212h is operable to rectify AC current to DC current. In three-phase operation, half-bridge totem pole leg 212 is operable both as synchronous buck converter to DC, and a synchronous boost converter from DC; half-bridge totem pole leg 212h is operable as a non-synchronous buck converter to DC. Benefits of PFC converter 200h include reduced cost and complexity, and improved reliability.

In FIGS. 2A through 2H, switches 230, 232, 238, 240, 246, 248, 254, 256, 282, 284, 231, 233, 239, 241, 247, and 249 are shown, for the purposes of illustration, as MOSFET switches. In practice, any of switches 230, 232, 238, 240, 246, 248, 254, 256, 255, 257, 231, 233, 239, 241, 247, and 249 may be replaced by another suitable switch. For example, any of switches 230, 232, 238, 240, 246, 248, 254, 256, 255, 257, 231, 233, 239, 241, 247, and 249 may be replaced by an insulated-gate bipolar transistor (IGBT) device.

In some implementations, the PFC converters of FIGS. 2A to 2H operate in an interleaved mode in which the parallel half-bridge totem pole legs share current and the switching is staggered, i.e., out of phase with one another. By staggering the switching, ripple currents can at least partially cancel one another, and the total ripple current seen at the input and output can be reduced. Advantages of reduced ripple current can include a smaller electromagnetic interference (EMI) filter at the input, and a smaller filter capacitance at the output. Reducing the ripple current can also reduce conduction losses.

In other implementations, the PFC converters of FIGS. 2A to 2H operate without interleaving. The presence of parallel half-bridge totem pole legs in non-interleaved operation can advantageously share current and spread heat.

Figure 3:
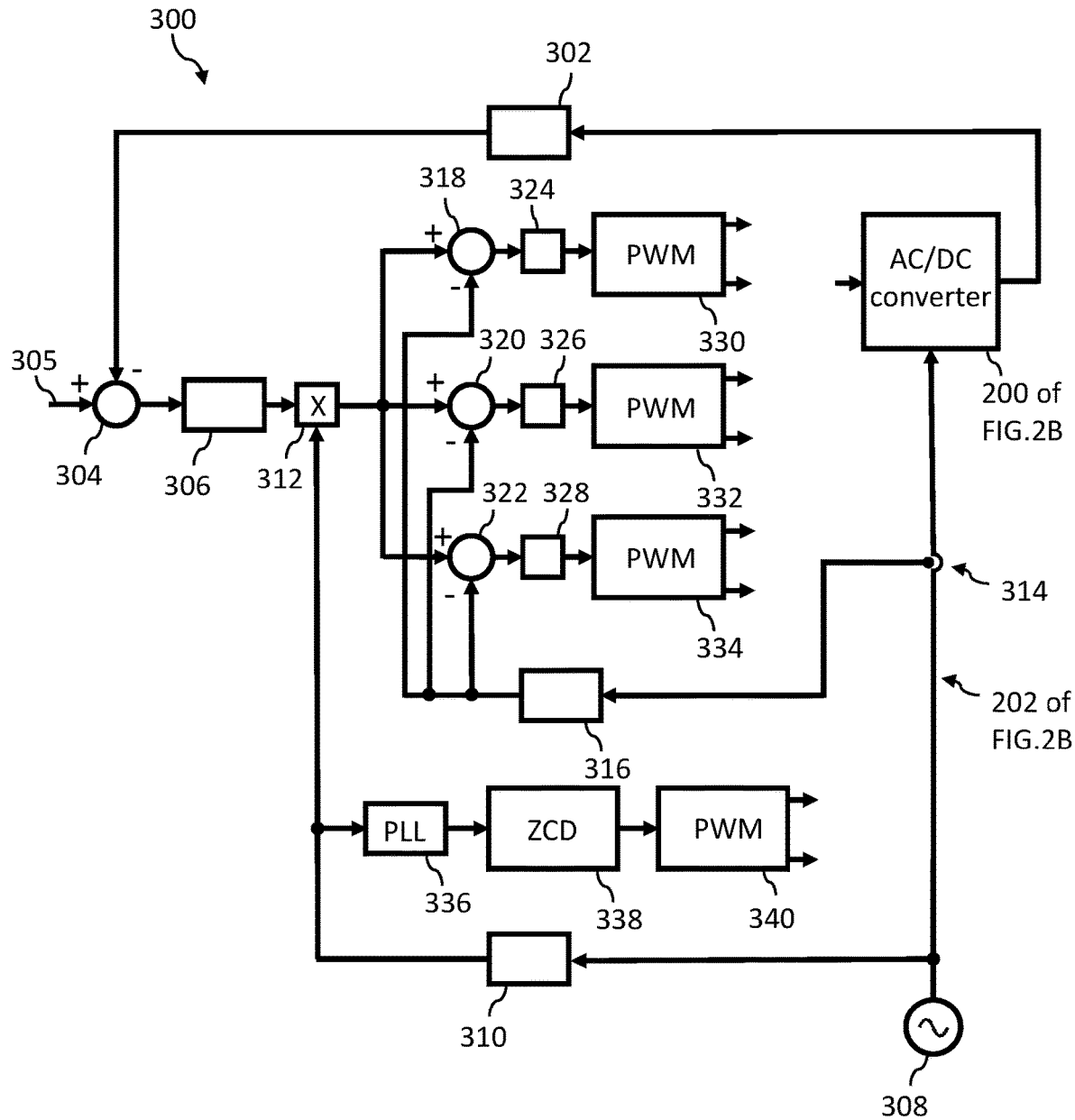
FIG. 3 is a block diagram of an example implementation of a system that includes a PFC converter (for example, the PFC converter in FIG. 2), in a three-channel interleaved boost single-phase AC input mode of operation, including average current mode control, according to the present disclosure.

FIG. 3 is a block diagram of an example implementation of a system 300 that includes a PFC converter (e.g., PFC converter 200 in FIG. 2), in a three-channel interleaved boost single-phase AC input mode of operation, including average current control, according to the present disclosure. For example, S. Choudhury, AVERAGE CURRENT MODE CONTROLLED POWER FACTOR CORRECTION CONVERTER USING TMS320LF2407A, Application Report SPRA902A—July 2005 describes average current mode control of a PFC converter. Some elements of system 300 (for example the PFC converter and AC sources) have been described above with reference to FIG. 2B.

System 300 of FIG. 3 is an example of an average current mode control system for a single-phase three-channel interleaved totem pole PFC. System 300 is simplified in FIG. 3 for the sake of clarity in illustration.

The output voltage can be controlled by an outer voltage loop. A sinusoidal current reference for interleaved inner current loop controllers can be provided by a product of an output of a proportional-integral (PI) controller and a scaled sampled input voltage. An output of current compensators can be applied to pulse-width modulation (PWM) blocks.

The PWM registers of a digital signal processor (DSP) can be set in dual-slope mode (i.e., triangular carrier), and phases a, b, and c are phase shifted by 120° to interleave the three phases. The PWM pulses in each switch leg can be complementary, and a dead band of, for example, 200 ns can be added between complementary pulses to avoid shoot-through (overlapping conduction of a pair of switches). Switches 254 and 256 of PFC converter 200 of FIG. 2B can provide a return path for a current in the negative and positive half cycles, respectively. A phase locked loop (PLL) block can measure a phase angle to control switches 254 and 256.

System 300 of FIG. 3 is an example implementation of a closed-loop control system for the truly universal PFC converter of FIG. 2A operating in a single-phase three-channel interleaved totem pole mode, as shown in FIG. 2B with RELAY1 set in the AB position and RELAY2 set in the AC position. As described above, in some implementations, switches 230, 232, 238, 240, 246, and 248 can be operated at high frequency (for example, 50 kHz) PWM), and switches 254 and 256 can be operated at the mains line-frequency (for example, 50 or 60 Hz). System 300 can provide gate control signals, for example pulse-width modulation (PWM) signals, to the MOSFET switches operated at high-frequency and line-frequency, to control an output bus voltage and maintain power factor correction for an input current.

A voltage attenuator and filter 302 samples the output bus voltage and scales down the output bus voltage from a value in the range 0 V-1000 V to a value in the range 0 V-3.3 V. The scaled-down output bus voltage can be read by a digital signal processor (DSP) analog-to-digital converter (ADC) to generate a feedback voltage. In some implementations, voltage attenuator and filter 302 is an operational amplifier (op-amp) sampling circuit.

Summer 304 generates an output equal to a difference between the feedback voltage and a reference value 305 (for example, desired DC bus voltage 204 of FIG. 2B). The output of summer 304 is applied to a controller 306. In some implementations, controller 306 is a proportional integral (PI) controller. Controller 306 generates a reference amplitude for the phase current.

An AC grid voltage 308 is sampled and scaled to unity by element 310 to synthesize a sinusoid with unity amplitude that is in phase with an input and can be used to generate a reference current signal. A multiplier 312 generates a product of the reference amplitude (provided by controller 306) and the sinusoidal reference current (provided by element 310).

Currents from three channels sampled by sensors 314 (illustrated by a single line in FIG. 3) are scaled by element 316, and applied as feedback currents to summers 318, 320, and 322 to be compared to a current reference from multiplier 312. In some implementations, element 316 includes one or more op-amps for signal sampling, conditioning, and attenuation.

The outputs of summers 318, 320, and 322 are fed to controllers 324, 326, and 328 respectively, to generate inputs for PWM blocks 330, 332, and 334 respectively. PWM blocks 330, 332, and 334 generate complementary PWM gate drive signals with a dead band (for example, a dead band of 200 ns) to avoid a shoot-through fault. A shoot-through fault is a fault that can occur when switches have overlapping operation (i.e., are "on" at the same time), which can result in an undesirable short circuit of an output capacitance. An output of 330 is applied to switches 230 and 232 of FIG. 2B. An output of PWM block 332 is applied to switches 238 and 240 of FIG. 2B. An output of PWM block 334 is applied to switches 246 and 248 of FIG. 2B.

Phase-locked loop (PLL) 336 determines a phase angle of AC grid voltage 308. The phase angle from PLL 336 is input to a zero cross detector 338, which determines when AC grid voltage 308 is approximately zero and crossing from negative to positive or vice versa. Zero crossing information from zero cross detector 338 is fed to PWM block 340 and used to control switches 254 and 256 of FIG. 2B such that they operate as synchronous rectifiers to provide a return path to an AC neutral or a second AC phase line at a mains line frequency (e.g. 50 or 60 Hz).

In some implementations, system 300 does not provide gate drive signals to control the line-frequency rectification of switches 254 and 256 of FIG. 2B. Anti-parallel diodes 258 and 260 of FIG. 2B may be allowed to "free wheel" or automatically commutate as the AC line voltage crosses from negative to positive and vice-versa. In some operating conditions, this may result in higher losses than if the switches were turned "on", if the resistance of the conducting channels of switches 254 and 256 would result in a lower voltage drop than the forward voltage of diodes 258 and 260. In some implementations, external anti-parallel diodes are provided in addition to the intrinsic anti-parallel body diodes of the switches. In some implementations, switch 256 is absent, with line-frequency rectification performed exclusively by diode 260 in the AC line positive half-cycle (switch 254 could still perform line-frequency rectification in the AC line negative half-cycle). In this case the DC/DC buck converter in cascaded three-phase boost plus buck mode could still operate to step down the intermediate bus voltage to the PFC converter's output, but it would not be capable of bidirectional operation, i.e. the PFC converter could convert AC power to DC, but not inverter DC power to AC. In some implementations, switches 254 and 256 are absent, with line-frequency rectification performed exclusively by diodes 258 and 260. In this case the PFC converter's operating modes could become limited, for example a 400 VDC output with high three-phase input voltages (e.g., 400 VAC 480 VAC, or 600 VAC line-to-line) may not be achievable owing to an absence of a voltage-reducing buck converter function.

Control system can include digital (software) and analog (hardware) elements, depending on the implementation.

The interface between system 300 and the truly universal PFC converter of FIG. 2B is not described in detail in FIG. 3. For the sake of clarity, FIG. 3 shows the truly universal PFC converter 200 of FIG. 2B as a single element.

FIG. 3 illustrates an example implementation of a control system. Other implementations may include additional elements and/or omit some of the elements shown in FIG. 3. For example, in some implementations, the current sensors precede the PFC inductors. In other implementations, there are two current sensors per switching leg instead of only one, and the current sensors are in series with (e.g., below and above) the two switches. See, for example, S. Kampl and R. Garcia, "2500W full-bridge totem-pole power factor correction using CoolGaN™", Infineon Application Note AN_201702_PL52_01 (2018).

Figure 4:
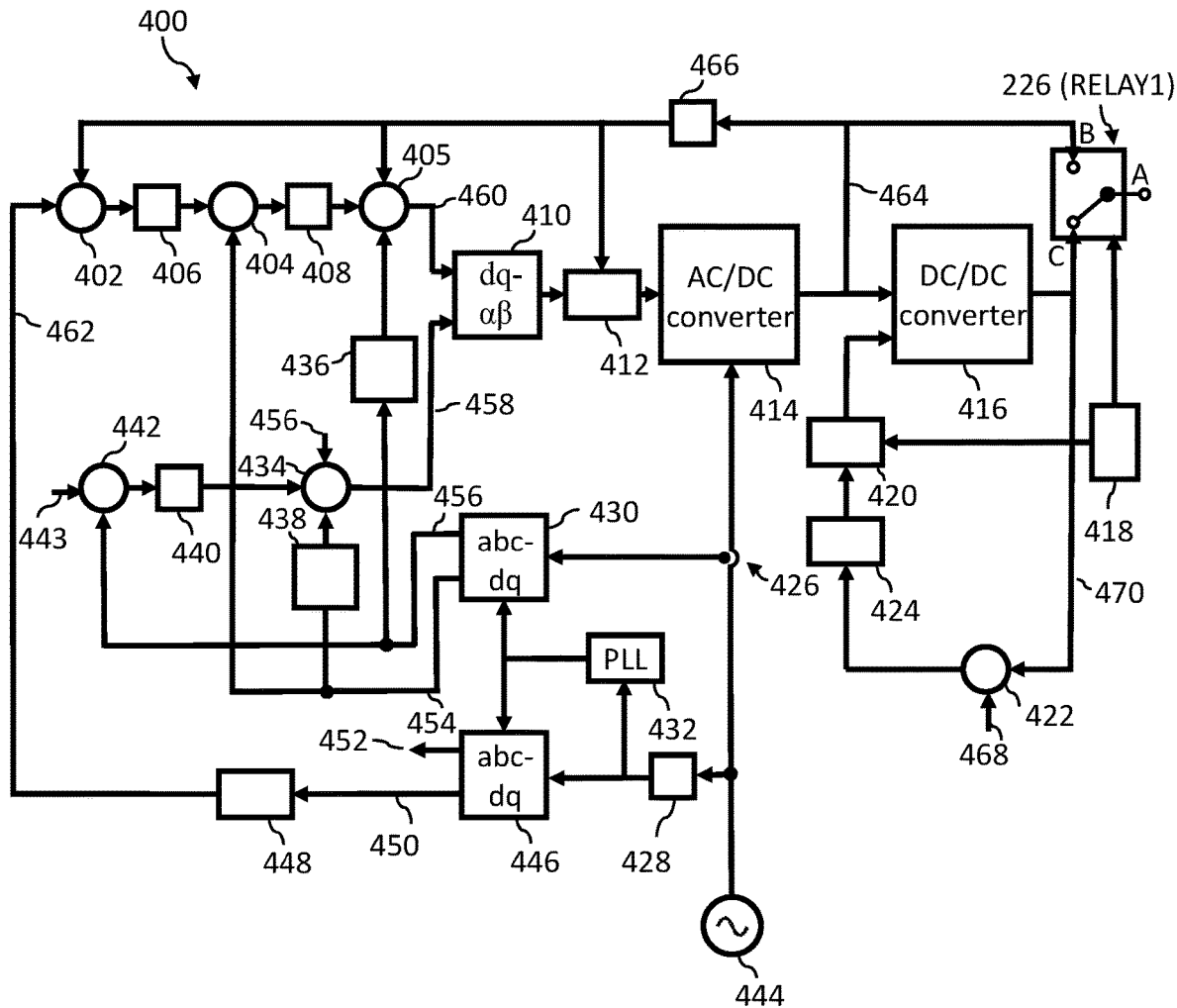
FIG. 4 is a block diagram of an example implementation of a system that includes a PFC converter (for example, the PFC converter of FIG. 2), in a three-phase boost AC input mode of operation, including direct-quadrature and space vector modulation control, followed by a selectively-operable buck DC/DC mode of operation, including voltage mode control, according to the present disclosure.

FIG. 4 is a block diagram for an example implementation of a system 400 that includes a PFC converter (e.g. PFC converter 200 of FIG. 2A) in a three-phase AC input mode of operation, according to the present disclosure. Some elements of system 400 can be implemented using embedded code in a DSP. Some elements of system 400 (for example the PFC converter, relays, and AC sources) have been described above with reference to FIGS. 2C and 2D.

Direct-quadrature (DQ) control and space vector pulse width modulation (SVPWM) can be used to run the PFC converter. In order to maximize, or at least increase, an efficiency for a universal AC input cascaded three-phase boost followed by buck converter with, for example, a 400 VDC output, system 400 can implement an adaptive intermediate bus voltage method as shown in FIG. 4 and explained below. The second stage buck converter can be controlled with voltage mode control for the three-phase boost plus buck mode of operation.

System 400 is for a three-phase boost mode of operation, and a three-phase boost followed by buck mode of operation. See, for example, J. Schönberger, "Space Vector Control of a Three-Phase Rectifier using PLECS®," Plexim Application Example.

System 400 includes a space vector modulation, described for example in Schönberger (above), to implement control for a three-phase boost mode of operation.

System 400 includes summers 402, 404, and 405, and PI controllers 406 and 408.

System 400 also includes dq-to-αβ (Inverse Park Transform) block 410, space vector PWM block 412, AC/DC converter 414 (for example, three-phase boost PFC converter 266 of FIG. 2C, or 268 of FIG. 2D), and DC/DC converter 416 (for example, buck converter 270 of FIG. 2D). PWM signals from space vector PWM block 412 are applied to AC/DC converter 414, for example to control switches 230, 232, 238, 240, 246, and 248 of FIGS. 2C and 2D. DC/DC converter 416 is controlled using a voltage control method. AC line input 444 can be, for example, input 202 of FIGS. 2C and 2D. System 400 includes an AC input voltage sampling element 428.

System 400 also includes decision block 418, PWM block 420, summer 422, and PI controller 424. An error determined by summer 422 is applied to PI controller 424 to provide a desired command to PWM block 420. An output of PWM block 420 is applied to DC/DC converter switches (for example, switches 254 and 256 of half-bridge totem pole leg 212 of FIG. 2A). Decision block 418 determines whether a AC input voltage exceeds a threshold, for example if peak line-to-line AC input voltage plus a margin for regulation exceeds a target output voltage, for example 400 V. If so, decision block 418 sets RELAY1 226 in the AC position and enables the DC/DC converter 416. If not, decision block 418 sets RELAY1 226 in the AB position and disables the DC/DC converter 416.

System 400 also includes sensors AC input current measurement 426, an abc-to-dq (Clarke and Park Transform) block 430, an inductor voltage drop ωLid subtraction block 438, a PI controller 440, a summer 442, and an iq reference current 443. See, for example, J. Schönberger, "Space Vector Control of a Three-Phase Rectifier using PLECS®," Plexim Application for a description of subtracting ωLid. The abc-to-dq block 430 performs a Clarke and Park transformation to change a three-phase system into a system comprising rotating d-q axis DC quantities. See, for example, J. Schönberger, "Space Vector Control of a Three-Phase Rectifier using PLECS®," Plexim Application.

System 400 includes a PLL (phase lock loop) block 432 to determine a grid angle used in control calculations, a summer 434, and an inductor voltage drop ωLid subtraction block 436 that is the same as ωLid subtraction block 438.

System 400 also includes a three-phase input 444, a abc-to-dq (Clarke and Park Transform) block 446, a block 448, a direct axis voltage 450, a quadrature axis voltage 452, a direct axis current 454, a quadrature axis current 456, a signal vq1 458, and a signal vd1 460.

A reference voltage 462 is synthesized by transforming, in abc-to-dq block 446, three-phase input 444 (measured by AC input voltage measurement 428) into Vd (direct axis voltage) 450 and Vq (quadrature axis voltage) 452. Vd 450 can be obtained from an amplitude of the input voltage by scaling and adding a desired margin at block 448. The reference voltage can be synthesized for improved efficiency.

The phase currents are also sampled by sensors 426 (single-line diagram shown), and transformed to currents id 454 and iq 456 using abc-to-dq block 430. For PFC operation, the value of iq reference current 443 can be set to zero.

Signal vq1 458 can be synthesized by applying an error signal from iq reference current 443 to PI controller 440 and subtracting inductor voltage drop ωLid 438 and adding vq 452 which provides a command modulation signal vq1 458 to αβ block 410. Signal vd1 460 can also be synthesized by a similar method to the above.

An intermediate bus voltage 464 is sampled at block 466, and applied to the summer 402. A reference value of intermediate bus voltage 464 can be determined based at least in part on a peak value of an input voltage and a margin, where the margin can be selected to optimize efficiency.

Signals vd1 460 and vq1 458 can be transformed to stationary coordinate direct and quadrature axis (αβ) by dq-to-αβ block 410 to provide input for space vector PWM block 412.

The DC/DC converter 416 can be bypassed in a three-phase boost mode of operation by setting RELAY1 226 in the AB position.

In some implementations, control in FIGS. 3 and 4 can be provided by a sampling and signal conditioning circuit, for example using a Texas Instruments (TI) Delfino TMS320F28335 microcontroller. Other implementations variously use analog control, digital control with a microcontroller, a digital signal processor (DSP), a field-programmable gate array (FPGA), or a suitable combination of controls, for example in an application specific integrated circuit (ASIC).

Figure 5:
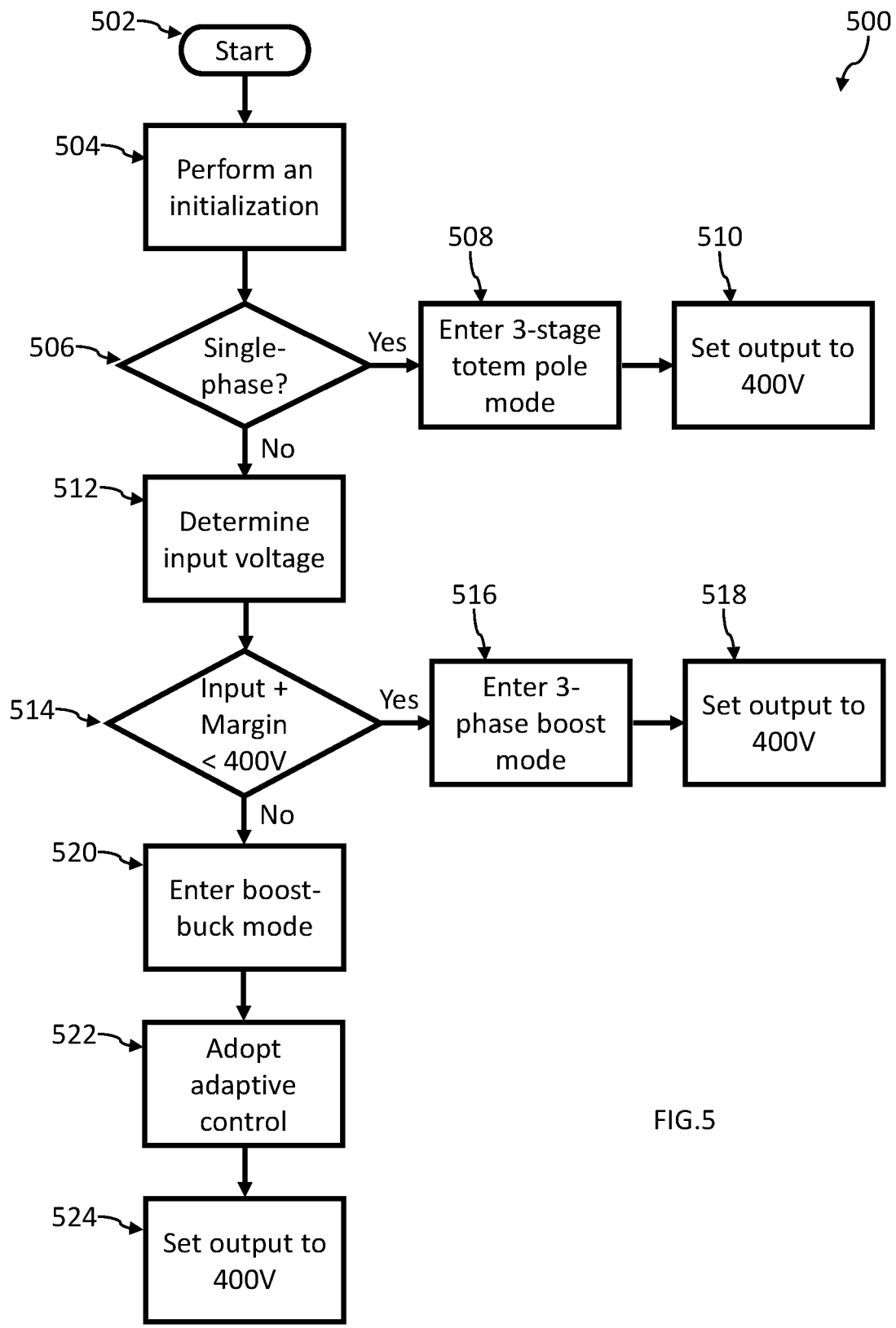
FIG. 5 is a flowchart illustrating an example simplified operating method for a truly universal input PFC converter (for example, the PFC converter of FIG. 2).

FIG. 5 is a flowchart illustrating an example simplified operating method 500 for a truly universal input PFC converter (for example, PFC converter 200 of FIG. 2).

Example operating method 500 of FIG. 5 includes acts 502 to 524. In some implementations, an operating method for a truly universal input PFC converter includes acts in addition to acts 502 to 524 of operating method 500 of FIG. 5. In other implementations, an operating method for a truly universal input PFC converter omits some of acts 502 to 524 of operating method 500 of FIG. 5. In some implementations, acts 502 to 524 of operating method 500 are executed at least partially in parallel or in a different order than shown in FIG. 5.

Operating method 500 begins at 502. At 504, operating method 500 performs an initialization. At 506, method 500 determines whether an input supply is single-phase or three-phase, the determination which is based at least in part on values of line voltages of the input supply. In some implementations, the determination is based at least in part on measurements of instantaneous voltage as a function of time.

If method 500 determines at 506 the input supply is single-phase, method 500 proceeds to 508 and causes the PFC converter to enter a three-channel interleaved totem pole mode (also referred to in the present application as a single-phase three-channel interleaved boost mode). In some implementations, causing the PFC converter to enter a three-channel interleaved totem pole mode includes setting one or more relays in the PFC converter. Setting the relays in the PFC converter may follow the settings in TABLE 2 (above). At 510, method 500 sets an output of the PFC converter. In some implementations, the output voltage is 400V.

If method 500 determines at 506 the input supply is three-phase, method 500 proceeds to 512 and determines a line-to-line voltage. In one implementation, method 500 determining a line-to-line voltage includes measuring a line-to-line voltage. At 514, method 500 determines whether a line-to-line peak voltage of the input supply plus a margin is less than a determined threshold voltage. In some implementations, the input supply is an input AC mains voltage. In some implementations, the determined threshold voltage is 400 V.

If method 500 determines at 514 the line-to-line peak voltage of the input supply plus the margin (also referred to in the present application as a regulation margin) is less than the determined threshold voltage, method 500 proceeds to 516 and causes the PFC converter to enter a three-phase boost mode. In some implementations, causing the PFC converter to enter a three-phase boost mode includes setting one or more relays in the PFC converter. Setting the relays in the PFC converter may follow the settings in TABLE 2 (above), e.g., with RELAY1 and RELAY2 both in the AB position. Setting the relays in the PFC converter may cause a second stage of the PFC converter to be bypassed. Bypassing the second stage of the PFC converter may result in improved efficiency. At 518, method 500 sets an output of the PFC converter. In some implementations, output of the PFC converter is 400 VDC.

If method determines at 514 the line-to-line peak voltage of the input supply plus the margin is greater than or equal to the determined threshold, method 500 proceeds to 520 and cause the PFC converter to enter a boost-buck mode (also referred to in the present application as a cascaded three-phase boost plus buck mode). In some implementations, causing the PFC converter to enter a boost-buck mode includes setting one or more relays in the PFC converter. Setting the relays in the PFC converter may follow the settings in TABLE 2 (above), e.g., with RELAY1 in the AC position and RELAY2 in the AB position. At 522, method 500 adopts an adaptive control.

One approach to maintaining PFC regulation for a universal AC input range with a cascaded three-phase boost converter followed by a buck converter is to boost the intermediate bus voltage internal to the PFC converter (i.e., between the boost and buck converters) to a fixed DC voltage that is held constant regardless of the input mains voltage level. This fixed voltage is chosen such that it exceeds the highest anticipated peak line-to-line voltage plus an amount of overvoltage necessary for stable voltage regulation (also called regulation margin).

For example, a universal 3-phase PFC converter designed for 200-480 VAC nominal line-to-line voltage would need to accommodate the peak line voltage at 480 VAC RMS nominal, plus for example a 10% tolerance, which would total 747 V. Adding for example a 7% regulation margin could bring the fixed voltage level to approximately 800 VDC. The 800 VDC intermediate bus between the boost and buck stages can then be stepped down by the buck stage to a 400 VDC output voltage of the PFC converter. Because the 800 VDC intermediate bus voltage setpoint is fixed, if the actual input voltage is lower (for example, 208 VAC line-to-line), the voltage must still be boosted all the way up to 800 VDC, and bucked down again to the desired PFC output voltage of 400 VDC, resulting in unnecessarily high losses.

Alternatively, the intermediate bus voltage can be controlled adaptively to optimize, or at least improve, efficiency. Preferred operating points (e.g. adaptive operating points) include the peak of the line-to-line AC mains voltage plus a margin for reliable regulation, as follows:

$$V_{bus} = \sqrt{2} V_{in} (1+\Delta)$$

where Δ is a regulation margin and is typically either a quantity in volts or a percent of input line-to-line peak voltage for reliable operation. For example, at a line input of 208 VAC RMS line-to-line, the intermediate bus voltage may be boosted to a voltage much lower than 800 VDC $V_{bus}=\sqrt{2}\times208V$ (1+7%)=315 VDC. In this case, it may be advantageous to minimize, or at least reduce, unnecessary boost and buck converting, and boost directly to the 400 VDC target output voltage while bypassing the buck converter entirely.

At 524, method 500 sets an output of the PFC converter. In some implementations, output of the PFC converter is 400V.

In some implementations, a worst-case loss estimation can be used to confirm the implementations are robust, with sufficient margin in the electrical and thermal sizing of components.

For PFC converter 200 of FIG. 2A, the efficiencies, and the magnitude and distribution of losses, can be similar in various of the operating modes. For example, the losses in the converter may be similar for operation with single-phase 240 VAC RMS line-to-neutral input, and 3-phase 208 VAC, 400 VAC, and 480 VAC RMS line-to-line inputs. In PFC converter 200 of FIG. 2A, components that are electrically and thermally sized for single-phase mode of operation may also be suitable for three-phase operation. This is advantageous for optimizing or at least improving the size, weight, and cost of a converter designed to operate from several different single-phase and three-phase nominal mains voltages.

For single-phase AC input at low-line, conduction losses in switches 230, 232, 238, 240, 246, and 248, and in inductors 214, 216, and 218 may be higher than in other operating modes. Accordingly, at single-phase low line, PFC converter 200 of FIG. 2A may operate at partial load if desired. For example, for a 120 VAC single-phase residential outlet in North America (or a 100 VAC single-phase residential outlet in Japan), PFC converter 200 may limit its power so as to reduce heating and thereby reduce a thermal load on its components. In some applications this may already be required by the electrical code, or the availability of suitable electrical outlets. For example, a power converter designed to output 3.3 kW or 6.6 kW at 240 VAC line-to-neutral single phase or 208, 400, or 480 VAC line-to-line three-phase, may need to limit output power when operating from a common North American residential 120 VAC outlet. For example, residential NEMA 5-15R and 5-20R receptacles commonly have 15 or 20 A breakers respectively, with an upper continuous current draw of 80% of rating i.e. 12 A or 16 A respectively; this may limit charger output power to approximately 1.2 kW or 1.6 kW respectively.

One approach to achieving higher current, voltage, and/or power in a converter, is to connect multiple semiconductor switches in parallel and/or in series. This may have other benefits such as spreading loss heat (better thermal management), as well as improved size and cost. In some implementations of the truly universal AC/DC PFC converter described in this application, a switch is replaced by two or more switches in series for higher input voltages. A converter with multiple switches in series can act as a multi-level converter, for instance a three-level converter. In some implementations, a switch is replaced by two or more switches in parallel for higher currents. Individual switches can be paralleled with additional switches, pairs of switches can be paralleled with additional pairs of switches, and/or half-bridge legs can be paralleled with half-bridge legs. Paralleled half-bridge legs with their central nodes electrically communicatively coupled to the same AC phase leg for PFC boost conversion can share the same input inductor, or have separate input inductors. Paralleled half-bridge legs with their central nodes electrically communicatively coupled to the PFC output voltage for DC/DC buck conversion can share the same inductor, or have separate inductors. Paralleled half-bridge legs can have their current in-phase (simple paralleling), or out of phase (interleaving), achieving at least partial ripple current cancellation.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). In another implementation, the present subject matter may be implemented via embedded software and/or firmware and microcontrollers. Those of skill in the art will recognize that many of the methods or algorithms set out herein may employ additional acts, may omit some acts, and/or may execute acts in a different order than specified.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet are incorporated herein by reference, in their entirety.

What is claimed is:

1. A power-factor corrected AC/DC converter comprising:
a first, a second, and a third half-bridge leg electrically communicatively coupled with each other to form an electrically parallel circuit, the first half-bridge leg comprising a first pair of switches, the first pair of switches comprising a first switch and a second switch, each switch of the first pair of switches electrically communicatively coupled to each other in series via a first node, the second half-bridge leg comprising a second pair of switches, the second pair of switches comprising a third switch and a fourth switch, each switch of the second pair of switches electrically communicatively coupled to each other in series via a second node, the third half-bridge leg comprising a third pair of switches, the third pair of switches comprising a fifth switch and a sixth switch, each switch of the third pair of switches electrically communicatively coupled to each other in series via a third node, each of the first, the second, and the third nodes electrically communicatively coupled through a first, a second, and a third inductor, respectively, to an AC port, the AC port comprising a first AC line;

a fourth half-bridge leg electrically communicatively coupled with the first, the second, and the third half-bridge legs to form an electrically parallel circuit, the fourth half-bridge leg comprising a fourth pair of switches, the fourth pair of switches comprising a seventh switch and an eighth switch, the fourth pair of switches electrically communicatively coupled to each other in series via a fourth node, the fourth node which in operation is electrically communicatively coupleable to a terminal of the AC port, the terminal which comprises one of an AC neutral or a second AC line; and a controller, wherein, in a first mode of operation, the AC port is an AC input, and, responsive to the controller determining an alternating current (AC) at the AC input is a single-phase AC, the controller is operable to:
control the first, the second, and the third half-bridge legs to operate as a 3-channel interleaved totem-pole AC/DC boost converter;
electrically communicatively couple the fourth node to the terminal of the AC port; and
control the fourth half-bridge leg to rectify a line frequency AC current to a DC current, and
wherein, in the first mode of operation, responsive to the controller determining the AC at the AC input is a three-phase AC, the controller is operable to control the first, the second, and the third half-bridge legs to operate as a 3-phase AC/DC boost converter.

2. The power-factor corrected AC/DC converter of claim 1, wherein, in a second mode of operation, the AC port is an AC output, and, responsive to the controller determining an AC at the AC output is a single-phase AC, the controller is operable to:
control the first, the second, and the third half-bridge legs to operate as a 3-channel interleaved DC/AC buck converter;
electrically communicatively couple the fourth node to the terminal of the AC port; and
control the fourth half-bridge leg to invert a DC current to a line frequency AC current, and
wherein, in the second mode of operation, responsive to the controller determining the AC at the AC output is a three-phase AC, the controller is operable to control the first, the second, and the third half-bridge legs to operate as a 3-phase DC/AC buck converter.

3. The power-factor corrected AC/DC converter of claim 2, further comprising a DC port, the DC port which is electrically communicatively coupled through a fourth inductor to the fourth node, wherein, in the second mode of operation, the DC port is a DC input, and, responsive to determining the AC at the AC output is the three-phase AC, the controller is further operable to cause the fourth half-bridge leg to step up to an intermediate voltage from the DC input, the intermediate voltage which is in parallel with the fourth half-bridge leg.

4. The power-factor corrected AC/DC converter of claim 2, wherein, in the second mode of operation, a DC input voltage of the power-factor corrected AC/DC converter is an output of an isolated bidirectional DC/DC converter.

5. The power-factor corrected AC/DC converter of claim 1, further comprising a DC port, the DC port which is electrically communicatively coupleable through a fourth inductor to the fourth node, wherein, in the first mode of operation, the DC port is a DC output, and, responsive to determining the AC at the AC input is the three-phase AC, the controller is further operable to cause the fourth half-bridge leg to step down an intermediate voltage to the DC output, the intermediate voltage which is in parallel with the fourth half-bridge leg.

6. The power-factor corrected AC/DC converter of claim 5, further comprising a ninth switch operable to selectively electrically communicably couple the DC port to one of the fourth node via the fourth inductor, or to the intermediate voltage.

7. The power-factor corrected AC/DC converter of claim 6, further comprising a tenth switch operable to electrically communicably couple the fourth node to the terminal of the AC port.

8. The power-factor corrected AC/DC converter of claim 7, wherein at least one of the ninth or the tenth switches is an electromechanical relay, the controller which in operation opens or closes the electromechanical relay.

9. The power-factor corrected AC/DC converter of claim 7, wherein at least one of the ninth or the tenth switches is one of a user-selectable manual switch or jumper, or a factory-set manual switch or jumper.

10. The power-factor corrected AC/DC converter of claim 1, wherein, in the first mode of operation, an output voltage of the power-factor corrected AC/DC converter is an input to an isolated DC/DC converter.

11. The power-factor corrected AC/DC converter of claim 10, wherein, in the first mode of operation, the output voltage of the power-factor corrected AC/DC converter is approximately 400 Volts DC.

12. The power-factor corrected AC/DC converter of claim 1, wherein at least one switch of the first, the second, the third, the fourth, the fifth, the sixth, the seventh, or the eighth switch comprises at least two switches electrically communicatively coupled in parallel with one another.

13. The power-factor corrected AC/DC converter of claim 1, wherein at least one switch of the first, the second, the third, the fourth, the fifth, the sixth, the seventh, or the eighth switch comprises at least two switches electrically communicatively coupled in series with each other.

14. The power-factor corrected AC/DC converter of claim 1, wherein at least one switch of the first, the second, the third, the fourth, the fifth, the sixth, the seventh, or the eighth switch comprises a field effect transistor (FET) device.

15. The power-factor corrected AC/DC converter of claim 1, further comprising a fifth half-bridge leg, the fifth half-bridge leg electrically communicatively coupled in parallel with the fourth half-bridge leg, wherein, in the first mode of operation, the controller is operable to control the fourth and the fifth half-bridge legs as an interleaved buck converter.

16. The power-factor corrected AC/DC converter of claim 1, wherein the controller comprises a digital controller.

17. A method of operation of a power-factor corrected AC/DC converter, the power-factor corrected AC/DC converter comprising a first, a second, and a third half-bridge leg electrically communicatively coupled with one another to form an electrically parallel circuit, the first half-bridge leg comprising a first pair of switches, the first pair of switches comprising a first switch and a second switch, each switch of the first pair of switches electrically communicatively coupled to each other in series via a first node, the second half-bridge leg comprising a second pair of switches, the second pair of switches comprising a third switch and a fourth switch, each switch of the second pair of switches electrically communicatively coupled to each other in series via a second node, the third half-bridge leg comprising a third pair of switches, the third pair of switches comprising a fifth switch and a sixth switch, each switch of the third pair of switches electrically communicatively coupled to each other in series via a third node, each of the first, the second, and the third nodes electrically communicatively coupled through a first, a second, and a third inductor, respectively, to an AC port, the AC port comprising a first AC line, and a fourth half-bridge leg electrically communicatively coupled with the first, the second, and the third half-bridges to form an electrically parallel circuit, the fourth half-bridge leg comprising a fourth pair of switches, the fourth pair of switches comprising a seventh switch and an eighth switch, the pair of switches electrically communicatively coupled to each other via a fourth node, the fourth node which in operation is electrically communicatively coupleable to a terminal of the AC port, the terminal which comprises one of an AC neutral or a second AC line, the method comprising a first mode of operation, the AC port in the first mode of operation being an AC input, the first mode of operation comprising:

determining by the controller whether an alternating current (AC) at the AC input is a single-phase AC or a three-phase AC;

responsive to determining the AC at the AC input is the single-phase AC:

controlling by the controller the first, the second, and the third half-bridges to operate as a 3-channel interleaved totem-pole AC/DC boost converter;

electrically communicatively coupling the fourth node to the terminal of the AC port; and controlling by the controller the fourth half-bridge leg to rectify a line frequency alternating current (AC) to a direct current (DC); and responsive to determining whether the AC at the AC input is the three-phase AC:

controlling by the controller the first, the second, and the third half-bridge legs to operate as a 3-phase AC/DC boost converter.

18. The method of claim 17, the method further comprising a second mode of operation, the AC port in the second mode of operation being an AC output, the second mode of operation comprising:

determining by the controller whether an alternating current (AC) at the AC output is a single-phase AC or a three-phase AC;

responsive to determining the AC at the AC output is the single-phase AC:

controlling by the controller the first, the second, and the third half-bridges to operate as a 3-channel interleaved DC/AC buck converter;

electrically communicatively coupling the fourth node to the terminal of the AC port; and controlling by the controller the fourth half-bridge leg to invert a DC current to a line frequency AC current; and responsive to determining the AC at the AC output is the three-phase AC:

controlling by the controller the first, the second, and the third half-bridges to operate as a 3-phase DC/AC buck converter.

19. The method of claim 18, the power-factor corrected AC/DC converter further comprising a DC port, the DC port which is electrically communicatively coupled through a fourth inductor to the fourth node, the DC port which in the second mode of operation is a DC input, the method further comprising in the second mode of operation:

responsive to determining the AC at the AC output is the three-phase AC, determining whether a peak voltage value of the three-phase AC exceeds a predetermined threshold value, the threshold value based at least in part on a predetermined target value of a voltage of the DC input; and responsive to determining the peak voltage value of the three-phase AC at the AC output exceeds the predetermined threshold value, operating by the controller the fourth half-bridge leg to step up to an intermediate voltage from the DC input, wherein the intermediate voltage is in parallel with the fourth half-bridge leg.

20. The method of claim 17, the power-factor corrected AC/DC converter further comprising a DC port, the DC port which is electrically communicatively coupleable through a fourth inductor to the fourth node, the DC port which in the first mode of operation is a DC output, the method further comprising in the first mode of operation:

responsive to determining the AC at the AC input is the three-phase AC, determining whether a peak voltage value of the three-phase AC exceeds a predetermined threshold value, the threshold value based at least in part on a predetermined target value of a voltage of the DC output; and responsive to determining the peak voltage value of the three-phase AC at the AC input exceeds the predetermined threshold value, operating by the controller the fourth half-bridge leg to step down an intermediate voltage to the DC output, wherein the intermediate voltage is in parallel with the fourth half-bridge leg.

21. The method of claim 17, further comprising:

responsive to determining a voltage of the AC port exceeds a predetermined threshold value, selectively electrically communicably coupling by a ninth switch a DC port to one of the fourth node through a fourth inductor, or an intermediate voltage in parallel with the first, the second, the third, and the fourth half-bridge legs.

22. The method of claim 17, further comprising electrically communicably coupling by a ninth switch the fourth node to the terminal of the AC port responsive to determining by the controller the AC at the AC input is the single-phase AC.

23. A power-factor corrected AC/DC converter comprising:

a first, a second, and a third half-bridge leg electrically communicatively coupled with each other to form an electrically parallel circuit, the first half-bridge leg comprising a first pair of switches, each switch of the first pair of switches electrically communicatively coupled to each other in series via a first node, the second half-bridge leg comprising a second pair of switches, each switch of the second pair of switches electrically communicatively coupled to each other in series via a second node, the third half-bridge leg comprising a third pair of switches, each switch of the third pair of switches electrically communicatively coupled to each other in series via a third node, each of the first, the second, and the third nodes electrically communicatively coupled through a first, a second, and a third inductor, respectively, to an AC input, the AC input comprising a first AC line;

a fourth half-bridge leg electrically communicatively coupled with the first, the second, and the third half-bridge legs to form an electrically parallel circuit, the fourth half-bridge leg comprising a switch electrically communicatively coupled to a diode in series via a fourth node, the fourth node which in operation is electrically communicatively coupleable to a terminal of the AC input, the terminal which comprises one of an AC neutral or a second AC line, the diode which electrically communicatively couples the fourth node to a negative terminal of a DC output, wherein, in operation, current flows from the negative terminal of the DC output to the fourth node; and
a controller, wherein, responsive to the controller determining an alternating current (AC) at the AC input is a single-phase AC, the controller is operable to:
control the first, the second, and the third half-bridge legs to operate as a 3-channel interleaved totem-pole AC/DC boost converter;
electrically communicatively couple the fourth node to the terminal of the AC input; and
control the fourth half-bridge leg to rectify a line frequency AC current to a DC current, and
wherein, responsive to the controller determining the AC at the AC input is a three-phase AC, the controller is operable to control the first, the second, and the third half-bridge legs to operate as a 3-phase AC/DC boost converter.

24. The power-factor corrected AC/DC converter of claim 23, wherein, responsive to determining the AC at the AC input is the three-phase AC, the controller is operable to cause the fourth half-bridge leg to step down an intermediate voltage to the DC output, the intermediate voltage which is in parallel with the fourth half-bridge, and a positive terminal of the DC output which is electrically communicatively coupled through a fourth inductor to the fourth node.

\* \* \* \* \*